United States Patent
Shipman, Jr. et al.

(10) Patent No.: US 12,339,712 B1
(45) Date of Patent: Jun. 24, 2025

(54) STORAGE AND CHARGING SYSTEM FOR LOCKING AND DISPENSING TABLETS

(71) Applicant: Tech Friends, Inc., Jonesboro, AR (US)

(72) Inventors: Bobby L. Shipman, Jr., Jonesboro, AR (US); Laura L Shipman, Jonesboro, AR (US); Bryan D. Taylor, Bono, AR (US); Bobby L. Shipman, III, Jonesboro, AR (US); Joshua L. Parrish, Paragould, AR (US); Joseph Michael Schaefer, III, Jonesboro, AR (US); Mark Haney, Jonesboro, AR (US)

(73) Assignee: TECH FRIENDS, INC., Jonesboro, AR (US)

( * ) Notice: Subject to any disclaimer, the term of this patent is extended or adjusted under 35 U.S.C. 154(b) by 423 days.

(21) Appl. No.: 17/972,267

(22) Filed: Oct. 24, 2022

Related U.S. Application Data

(63) Continuation-in-part of application No. 17/170,144, filed on Feb. 8, 2021, now Pat. No. 12,068,625, which is a continuation-in-part of application No. 17/125,228, filed on Dec. 17, 2020, now Pat. No. 11,591,159, which is a continuation-in-part of application No. 16/897,105, filed on Jun. 9, 2020, now Pat. No. 11,972,652, which is a continuation-in-part of application No. 16/033,045, filed on Jul. 11, 2018, now Pat. No. 10,678,302, which is a continuation-in-part of application No. 15/136,604, filed on Apr. 22, 2016, now Pat. No. 10,225,734, which is a continuation-in-part of application No. 14/923,271, filed on Oct. 26, 2015, now Pat. No. 10,256,645, which is a continuation-in-part of application No. 14/869,592, (Continued)

(51) Int. Cl.
G06F 1/16 (2006.01)

(52) U.S. Cl.
CPC .......... G06F 1/1679 (2013.01); G06F 1/1677 (2013.01)

(58) Field of Classification Search
CPC .................................................. G06F 1/1679
USPC ....................... 361/679.33, 679.58, 724–727
See application file for complete search history.

(56) References Cited

U.S. PATENT DOCUMENTS

| 4,922,721 | A | * | 5/1990 | Robertson | ................ F25B 21/02 62/3.61 |
| 5,033,972 | A | * | 7/1991 | Komatsu | .............. H01R 13/629 439/153 |

(Continued)

*Primary Examiner* — Adrian S Wilson
(74) *Attorney, Agent, or Firm* — Schrantz Law Firm, PLLC; Stephen D. Schrantz

(57) ABSTRACT

The charging station for charging devices, such as tablets, smart phones, mobile electronic devices, mobile computing devices, and other electronic devices accepts insertion of the device into a storage aperture. Insertion of the device into the storage pushes a receiver rearward towards a charging base. A locking finger locks the receiver into position to overcome biasing devices that bias the receiver towards the storage aperture. The locking finger maintain the position of the receiver. The locking finger also releases the receiver to push the device outwards towards the exit. A conductive contact within the storage aperture contacts the device to charge and communicate with the device. A blocking finger extends across the device to also limit removal of the device from the storage aperture.

20 Claims, 12 Drawing Sheets

Related U.S. Application Data filed on Sep. 29, 2015, now Pat. No. 9,917,455, application No. 17/972,267 is a continuation-in-part of application No. 17/671,433, filed on Feb. 14, 2022, now Pat. No. 12,035,210.

(56) References Cited

U.S. PATENT DOCUMENTS

| | | | | |
|---|---|---|---|---|
| 5,301,346 | A * | 4/1994 | Notarianni | G06F 21/31 710/64 |
| 5,324,204 | A * | 6/1994 | Lwee | G06F 1/184 439/541.5 |
| 5,383,789 | A * | 1/1995 | Watanabe | G06K 13/0806 439/159 |
| 5,473,505 | A * | 12/1995 | Kessoku | G06K 7/0021 439/260 |
| 5,573,413 | A * | 11/1996 | David | G06K 13/08 439/157 |
| 5,621,890 | A * | 4/1997 | Notarianni | G06F 13/409 710/303 |
| 5,890,920 | A * | 4/1999 | David | H05K 5/0295 439/157 |
| 5,899,421 | A * | 5/1999 | Silverman | F16M 11/38 248/924 |
| 5,899,763 | A * | 5/1999 | Kajiura | H01R 13/633 439/159 |
| 5,993,227 | A * | 11/1999 | Hsia | H05K 5/0265 439/159 |
| 6,008,621 | A * | 12/1999 | Madison | H02J 7/0042 320/111 |
| 6,045,377 | A * | 4/2000 | Kajiura | G06K 13/08 439/159 |
| 6,218,796 | B1 * | 4/2001 | Kozlowski | H02J 7/0013 62/239 |
| 6,252,514 | B1 * | 6/2001 | Nolan | G11B 33/128 361/170 |
| 6,270,365 | B1 * | 8/2001 | Nishioka | G06K 13/0856 439/159 |
| 6,381,139 | B1 * | 4/2002 | Sun | G06F 1/184 |
| 6,480,391 | B1 * | 11/2002 | Monson | H05K 7/1425 361/752 |
| 6,490,153 | B1 * | 12/2002 | Casebolt | G11B 33/128 361/679.33 |
| 6,699,128 | B1 * | 3/2004 | Beadell | H05K 5/0256 361/725 |
| 6,912,124 | B2 * | 6/2005 | Megason | H05K 7/1409 361/679.02 |
| 7,035,096 | B2 * | 4/2006 | Franz | G06F 1/184 |
| 7,055,833 | B2 * | 6/2006 | Wixted | B62B 3/006 312/223.6 |
| 7,130,190 | B1 * | 10/2006 | Baker | H02J 7/0031 280/47.35 |
| 7,295,447 | B2 * | 11/2007 | Strmiska | H05K 7/1409 361/801 |
| 7,570,484 | B1 * | 8/2009 | Sivertsen | G06F 1/187 361/679.37 |
| 7,642,744 | B2 * | 1/2010 | Zedell, Jr. | H02J 7/0045 320/112 |
| 9,122,458 | B2 * | 9/2015 | Yu | G06F 1/185 |
| 9,629,263 | B2 * | 4/2017 | Katsaros | H05K 7/1489 |
| 9,703,333 | B1 * | 7/2017 | Harting | G06F 1/187 |
| 9,913,395 | B2 * | 3/2018 | Milligan | H05K 7/1409 |
| 10,097,020 | B2 * | 10/2018 | Truong | H04W 12/065 |
| 10,188,014 | B2 * | 1/2019 | Potter | G06F 1/16 |
| 10,283,984 | B2 * | 5/2019 | Maguire | H02J 7/0044 |
| 10,396,574 | B2 * | 8/2019 | Maguire | A47B 96/1408 |
| 11,406,038 | B2 * | 8/2022 | Guillot | H05K 7/1412 |
| D979,489 | S * | 2/2023 | Bonilla | D13/107 |
| 11,870,279 | B2 * | 1/2024 | Bonilla | H02J 50/10 |
| 12,096,589 | B2 * | 9/2024 | Lin | H05K 7/1401 |
| 2002/0104396 | A1 * | 8/2002 | Megason | F16H 51/00 439/157 |
| 2003/0021091 | A1 * | 1/2003 | Robbins | G06F 1/183 312/223.1 |
| 2003/0111245 | A1 * | 6/2003 | Haggerty | G06F 1/1632 174/50 |
| 2003/0141687 | A1 * | 7/2003 | Wixted | G06F 1/1632 280/47.35 |
| 2004/0012921 | A1 * | 1/2004 | Hidaka | G11B 33/022 |
| 2004/0139571 | A1 * | 7/2004 | Chang | G06F 1/1632 15/315 |
| 2005/0110461 | A1 * | 5/2005 | McConnell | H04W 52/0296 320/116 |
| 2006/0171110 | A1 * | 8/2006 | Li | G11B 33/128 |
| 2007/0049071 | A1 * | 3/2007 | Jackson | G06F 1/1632 439/79 |
| 2007/0058344 | A1 * | 3/2007 | Baker | H02J 3/14 361/695 |
| 2007/0091559 | A1 * | 4/2007 | Malone | G06F 1/187 |
| 2007/0206351 | A1 * | 9/2007 | Szelong | G06F 1/187 361/829 |
| 2007/0217142 | A1 * | 9/2007 | Wagatsuma | G06F 1/181 361/679.37 |
| 2007/0279858 | A1 * | 12/2007 | Grady | G06F 1/183 361/641 |
| 2008/0106870 | A1 * | 5/2008 | Dully | H05K 7/18 361/747 |
| 2009/0016008 | A1 * | 1/2009 | Hock | G06F 1/263 361/679.55 |
| 2009/0016009 | A1 * | 1/2009 | Barrall | G06F 1/187 |
| 2013/0070415 | A1 * | 3/2013 | Terry | G11B 33/124 361/679.38 |
| 2013/0277930 | A1 * | 10/2013 | Ergun | G06F 1/189 280/47.35 |
| 2015/0223348 | A1 * | 8/2015 | Sagar | G06F 1/28 713/340 |
| 2019/0044350 | A1 * | 2/2019 | Shadrokh | H02J 7/0013 |
| 2019/0239380 | A1 * | 8/2019 | Guillot | G06F 1/20 |

* cited by examiner

STORAGE AND CHARGING SYSTEM FOR LOCKING AND DISPENSING TABLETS

CROSS-REFERENCE TO RELATED APPLICATIONS

This application claims priority to and is a continuation in part of U.S. patent application Ser. No. 17/170,144 entitled "STORAGE AND CHARGING SYSTEM WITH DRAINAGE TABLETS" that was filed on Feb. 8, 2021 that is a continuation in part of U.S. patent application Ser. No. 17/125,228 entitled "STORAGE AND CHARGING SYSTEM FOR DISPENSING TABLETS" that was filed on Dec. 17, 2020 that is a continuation in part of U.S. patent application Ser. No. 16/897,105 entitled "SECURED CHARGING SYSTEM FOR ELECTRONIC DEVICES" that was filed on Jun. 9, 2020 that is a continuation in part of U.S. patent application Ser. No. 16/033,045 entitled "SECURED STORAGE FOR ELECTRONIC DEVICES" that was filed on Jul. 11, 2018 that issued as U.S. Pat. No. 10,678,302 on Jun. 9, 2020, that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019, which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System" that was filed on Sep. 29, 2015 that issued as U.S. Pat. No. 9,917,455 on Mar. 13, 2018, which are incorporated herein by reference.

This application also claims priority to and is a continuation in part of U.S. patent application Ser. No. 17/671,433 entitled "DAMAGE AND INSTUSION DETECTION SYSTEM" that was filed on Feb. 14, 2022 which is a continuation in part of U.S. patent application Ser. No. 16/897,105 entitled "SECURE CHARGING SYSTEM FOR ELECTRONIC DEVICES" that was filed on Jun. 9, 2020 which is a continuation in part of U.S. patent application Ser. No. 16/033,045 entitled "SECURED STORAGE FOR ELECTRONIC DEVICES" that was filed on Jul. 11, 2018 that issued as U.S. Pat. No. 10,678,302 on Jun. 9, 2020, that is a continuation in part of U.S. patent application Ser. No. 15/136,604 entitled "SECURED STORAGE FOR ELECTRONIC DEVICES" that was filed on Apr. 22, 2016 that issued as U.S. Pat. No. 10,225,734 on Mar. 5, 2019, which is a continuation in part of U.S. patent application Ser. No. 14/923,271 entitled "Protective Housing" that was filed on Oct. 26, 2015 that issued as U.S. Pat. No. 10,256,645 on Apr. 9, 2019 which is a continuation in part of U.S. patent application Ser. No. 14/869,592 entitled "Charging Unit and System for at least One Electronic Device" that was filed on Sep. 29, 2015 that issued as U.S. Pat. No. 9,917,455 on Mar. 13, 2018 which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

In large organizations such as businesses, schools, hospitals, nursing homes, controlled environment facilities, correctional facilities, and jails, it is becoming increasingly common to have a significant number of mobile electronic devices to be charged on a regular basis. Current art for charging systems provides for basic charging but not comprehensive administration and control of mobile electronic charging throughout the organization. The present invention provides for large scale control of mobile device charging not possible with current art.

The present invention relates to a security system for charging and tracking tablets, smart phones, mobile computing devices, mobile electronic devices, and other electronic devices. The present invention provides a housing for storing and charging the devices within the housing. The housing secures the devices within the housing to limit access of the devices within the housing. The housing also releases the devices to users for accessing the devices.

The housing provides chargers at charging locations within the device. The devices are stored at the charging locations within the housing. A lock secures the devices within the housing to limit access to the devices stored within the housing.

The storage and charging system allow remote control and management of the charging activity and mobile electronic device. The secure charging system may also be implemented with an identification system for the electronic device. In another embodiment, the secure charging system may securely store the electronic device to prevent unauthorized access to the device.

The secure charging system provides a method of charging the electronic device and a method of communication for remote administration. In one embodiment, the secure charging system may be implemented with communication capabilities to a controller and respond to commands from the controller. In another embodiment, the secure charging station may be implemented with peer-to-peer communications between charging stations.

If the user is granted access to a device, the lock releases the device for removal of the device from the housing. The user may then remove the device from the housing through the housing aperture. To secure the device upon insertion, a lock within the housing secures the device within the housing.

In some embodiments, the secure charging system may accept commands and utilize a controller to coordinate charging activities across multiple chargers which are physically separated from one another. In one embodiment, the secure charging system could disable charging for one or more electronic devices based on a remote command. In another embodiment, the secure charging system could report all electronic devices currently being charged.

In one embodiment, the secure charging system may be implemented with an identification system to identify electronic devices attempting to charge. In this embodiment, charging could be enabled or disabled based on the identity of the electronic device and the rules established by administrative personnel. In some embodiments, the secure charging system reports electronic device identity and charging status to a controller. In some embodiments, the charging system may bill or track electricity usage based upon information collected and/or reported by the secure charging system. In other embodiments, the secure charging system may send alerts if an electronic device has not been returned to a charger within a specified amount of time.

The controller of one embodiment tracks usage of the devices. The controller tracks the devices that are checked out and the devices that have been returned. The controller generates reports identifying the status of the devices. Such statuses include but are not limited to devices within the housing, devices out of the housing, devices in the housing not charging, devices charging in the housing, and updates to the device. The controller generates reports identifying the status of the devices and the date and the time of the status of the device.

In some embodiments, the secure charger may be equipped with cameras to identify persons retrieving mobile electronic devices from the secure charger. In some embodiments, cameras may take pictures of returned mobile electronic devices for damage assessment and transmit the pictures to a controller for evaluation.

In some embodiments, a touchscreen for entry is attached to the secure charger for entry of user authentication information. In other embodiments, the charger integrates a biometric device such as a camera, microphone, fingerprint reader, or the like, for authentication.

The present invention also provides an easy access system for accessing the internal components of the storage system. The front wall secures to the housing to allow opening of the front wall. The front wall of one embodiment pivotally attaches to the housing. In one embodiment, hinges secure the front wall to the housing. Opening the front wall enables access to the internal components for servicing and maintaining the storage system. In another embodiment, the front wall removably attaches to the housing for removal of the front wall. In another embodiment, the front wall slideably attaches for sliding the front wall open to access the interior of the housing.

II. Description of the Known Art

Certain problems exist with the known art. Known charging systems do not securely store devices within a housing that limit damage to the storage system. Known charging systems do not default to the locking state to limit access of the tablets and other devices stored within the housing. Such safeguards within the housing limit damage to the internal components and the mobile devices within the housing.

Known charging systems provide unfettered and unmonitored access to charging services after an electronic device is physically connected to the charger. Known charging systems do not allow remote management of chargers by administrative personnel. Known charging systems do not allow multiple chargers which are physically separated to act in unison as a single charging system.

Known charging systems for electronic devices do not allow security rules to be enacted to prevent unauthorized charging of devices. Known charging systems do not allow a controller to maintain charging rules which can automatically enable or disable charging to specific electronic devices or specific physical charging connections. Known charging systems cannot aggregate data into an analytical engine to determine costs or usage across multiple distributed chargers.

Known charging systems for electronic devices do not monitor when devices are charging or stop charging. Known charging systems do not report to a controller for tracking usage or billing activities. Known charging systems for electronic devices do not monitor the physical condition of the electronic device or assess it for damage while using the charging system.

Known charging systems for electronic devices do not disable the electronic device if the electronic device is not returned to a specified charger within a defined period of time. Known charging systems do not send alerts to administrative personnel when an electronic device has not been returned to a charger within a defined period of time.

Known charging systems for electronic devices do not take pictures of mobile electronic devices inserted for charging.

The present invention is needed to provide a unique charging system that efficiently manages large numbers of electronic devices within an organization such as a business, a school, correctional facility, or jail. The present invention is needed to prevent unauthorized charging and provide auditable rules-based security for charging electronic devices. The present invention is needed to enforce electronic device usage limits based on physical return of electronic devices to a charging station, such as a housing with chargers, according to established rules.

SUMMARY OF THE INVENTION

The present invention relates to secured charging for charging tablets, smart phones, mobile electronic devices, mobile computing devices, and other electronic devices. The secured charging system secures the devices to limit access and charges the devices while securing the devices The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The secured charging system of the present invention limits access to the devices, such as the tablets.

The housing securely stores the devices at charging locations at which the devices are charged. A blocking arm secures the devices, such as the tablets, within the housing. The blocking finger of the blocking arm is configured to reduce the users from tampering or otherwise removing the device from the housing. The blocking finger pivotally attaches to the housing to adjust between a locked position and an unlocked position.

A positioning finger of the blocking finger operates the blocking arm. The positioning finger travels through a positioning track. The position of the positioning finger within the positioning track positions the blocking finger in the locked position or the unlocked position.

The blocking finger is recessed within the housing to limit manual adjustment of the blocking finger. The increased difficulty of manipulating the blocking finger increases the difficulty of unauthorized access to the devices secured within the housing. The blocking finger limits removal of the device from a charging location for charging the device. The blocking finger may extend across a portion of the device, extend across the entire device, or extend beyond the device.

The adjustment of the blocking finger may also trigger actions by the controller and housing. Unauthorized adjustment of the blocking finger may power off the devices, adjust a protective screen to cover the storage apertures to block access to the devices, or activate an alarm or other alert. Unauthorized movement of the blocking finger may be detected by a switch, a camera, a photo eye, an IR beam detection system, or other detection systems.

The housing provides charging locations at which each device, such as a tablet, is stored and charged within the housing. A charging device, such as a charger, located at each charging location charges the computing device while the device is stored within the housing. The charging locations are located at fixed locations within the housing. Another embodiment provides wireless charging that allows charging of the devices within the housing. Such wireless charging may be implemented in the storage locations such that placement of the device within the housing enables charging of the device.

The charging device may provide conductive contacts that contact the electrical conductive contacts of a mobile electronic device when the device is properly placed into the housing. Other embodiments may implement wireless charging as discussed below such as inductive charging.

In one embodiment, the charging system identifies the mobile electronic device by exchanging identification data with the device electronically and communicates with a controller. In one embodiment, the controller creates a charge request to charge the device. The controller compares the charge request against a database of charging rules which apply to the specific mobile electronic device. If the rules are met, the controller communicates to the charger that charging is allowed for the device. Once the secure charger receives authorization from the controller, electricity flows through the charging conductors between the secure charger and the mobile electronic device for charging the battery of the mobile electronic device. The charger may also charge the device according to a charging profile associated with the device or a device having conditions similar to the device.

In another embodiment, the secure charger may also be implemented with a locking system for securing the mobile electronic device until authentication of the user and device are completed by an authentication system. Such an authentication system may be implemented locally or remotely, such as on a server. The authentication system verifies the identity of the user.

A rules logic system implemented on a controller, such as a remote server or a local computing device, may apply the rules of the system. Such rules may be implemented by the facility. Once verified against a database of rules, the housing releases the mobile electronic device for removal of the device from the housing if the rules are met. Otherwise, the controller instructs the housing to not release the device.

In one embodiment, an administrator inputs charging rules into a central server database using a web form. The administrator specifies a rule defining the devices allowed to charge, the times charging is allowed, and the users allowed to unlock the mobile electronic device from the secure charger. These rules may be stored locally to be applied by the controller. The controller may also communicate with a server to access remotely stored rules.

Upon request by the secure charger, the controller uses the predefined rules setup by the administrator to determine whether the mobile electronic device should be charged while connected to the secure charger. In this embodiment, the controller also authenticates end users requesting the release of a mobile electronic device locked in the secure charger and determines whether to unlock the mobile electronic device based on the rules established by the administrator.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device.

Passwords have traditionally controlled access to a WIFI system. However, the users can access, use, and misuse the device without WIFI access. The present invention limits usage of electricity to eventually limit the usage of unauthorized devices. If the unauthorized devices cannot be charged, usage of the unauthorized devices will eventually cease.

Most devices provide a port for accepting a charger. The charging port may accept USB, USB micro, USB mini, Lightning, or other electrical insertion connection. New connections with new ports will more than likely be developed in the future. In some embodiments, a charging adapter of the present invention inserts into the port of the device. The charging adapter can be modified to function with the new ports and electrical insertion connections. In other embodiments, charging could be provided by inductive charging pads, ultrasonic transmission, light transmittal, or other energy transmittal mechanisms that charge mobile electronic devices.

In some embodiments, a protective housing on the device is keyed to the charging station to orient the device when inserting the device into the charging station. The charging adapter is secured within the housing to enable charging of the device. Keyed locks or audible alarms could increase the security features of the present invention.

The housing of one embodiment protects the device from damage. The housing may also prevent access to certain features of the device. Eliminating access to these features prevents users from gaining unauthorized access to the device. The housing also prevents users from resetting the device to allow unfettered access to the user.

It is an object of the present invention to provide centrally controlled mobile electronic device locking.

It is an object of the present invention to limit unauthorized access of devices, such as tablets, secured within the housing.

It is an object of the present invention to provide increased security of the devices within the housing.

It is another object of the present invention to limit physical manipulation of the blocking finger for unauthorized access of the device.

It is an object of the present invention to track and record activity related to mobile electronic device insertion into and removal from a plurality of charging bases.

It is an object of the present invention to store devices within a housing.

It is an object of the present invention to limit access to devices stored within the housing.

It is an object of the present invention to charge the devices while the devices are within the housing.

It is an object of the present invention to provide centrally controlled mobile electronic device charging.

It is an object of the present invention to enable charging to mobile electronic devices only when administrative rules have been met.

It is an object of the present invention to track and record activity related to mobile electronic device charging and present it in usable form for billing or other administrative purposes.

It is an object of the present invention to prevent charging unauthorized mobile electronic devices.

It is an object of the present invention to securely charge an approved mobile electronic device within secure storage.

It is an object of the present invention to limit access to the electronic device by storing the device within the secure storage.

It is an object of the present invention to monitor usage of the electronic device by maintaining records of users who remove the device from the secure storage.

It is an object of the present invention to monitor charging of the electronic device by maintaining records of device presence on the secure charger and activation of charging to the device.

It is an object of the present invention to control access to the electronic device by restricting user's access to the device from the storage.

It is an object of the present invention to control access to the electronic device by allowing users access to the device from the storage.

It is another object of the present invention to simplify the process of administrating the charging of multiple mobile electronic devices across an organization.

It is another object of the present invention to reduce the costs associated with charging multiple devices.

It is another object of the present invention to reduce unauthorized use and misuse of devices by restricting charging a mobile electronic device which has not been approved by the organization.

It is another object of the present invention to charge multiple mobile electronic devices within a single charging station.

It is another object of the present invention to limit access to selected users of the mobile electronic device.

It is another object of the present invention to limit access to selected features of the mobile electronic device.

It is another object of the present invention to clean, disinfect, and/or sanitize the mobile electronic device.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
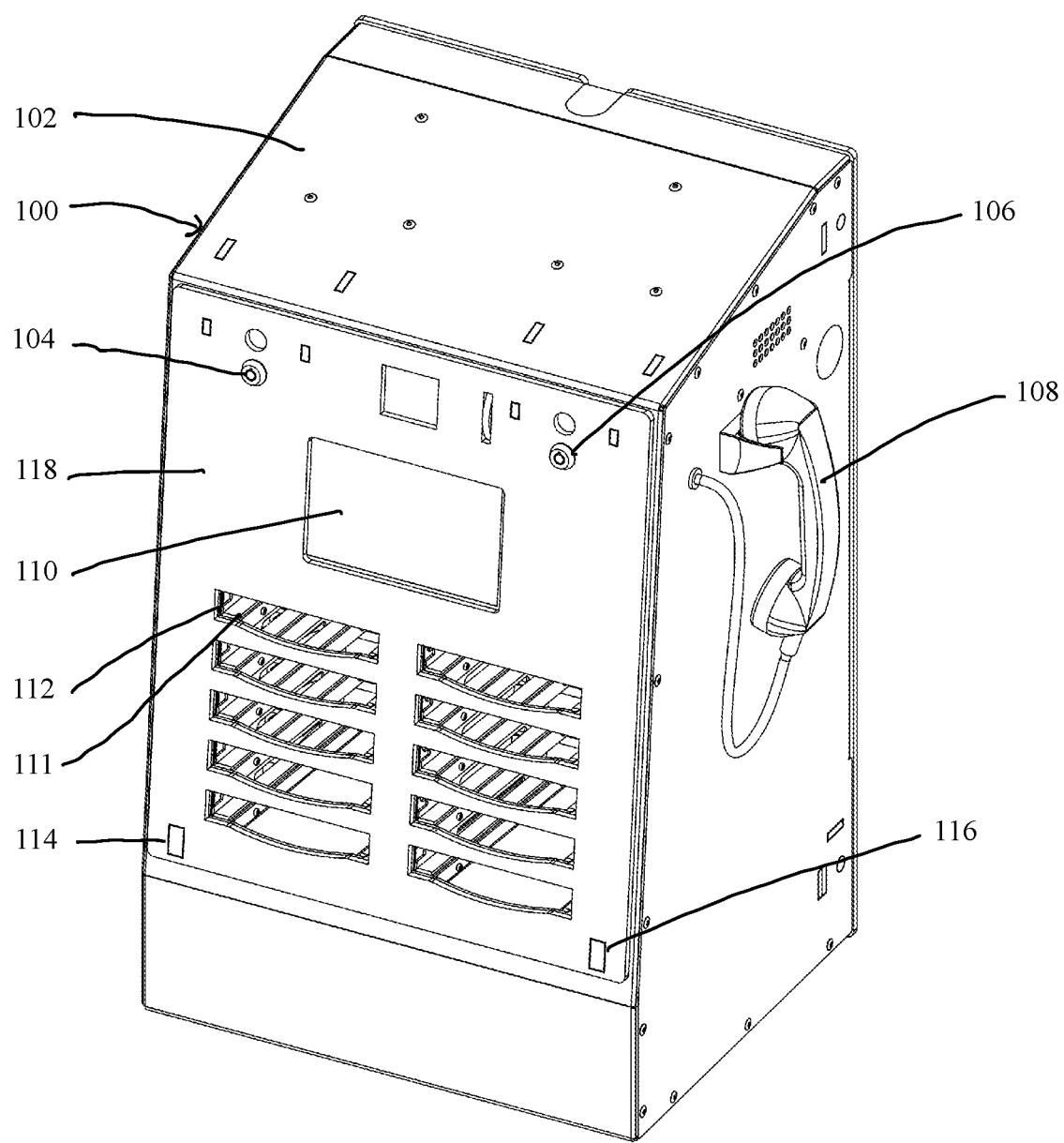
FIG. 1 is a front right perspective view of one embodiment of the present invention.
Figure 2:
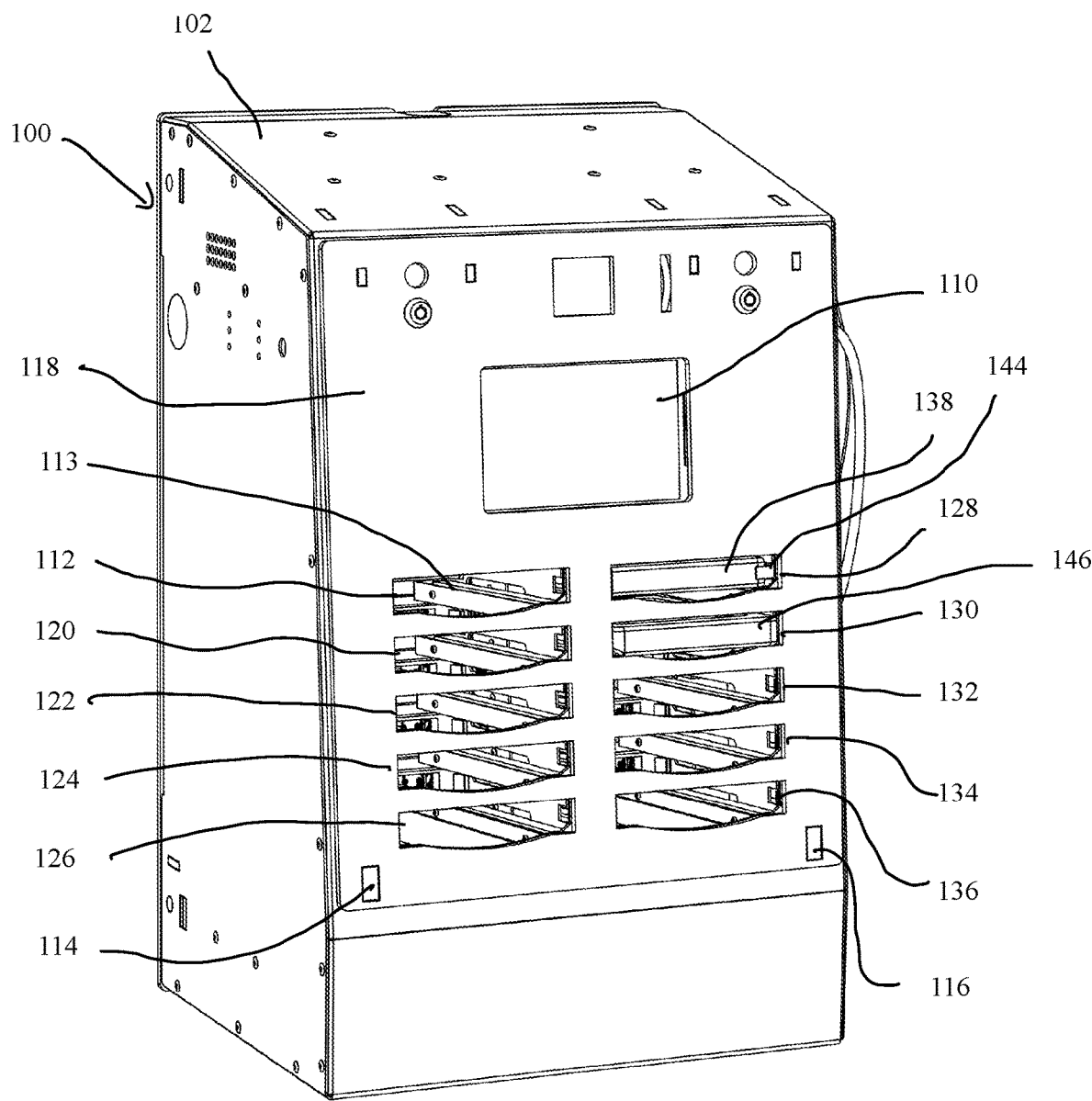
FIG. 2 is a front left perspective view thereof.
Figure 4:
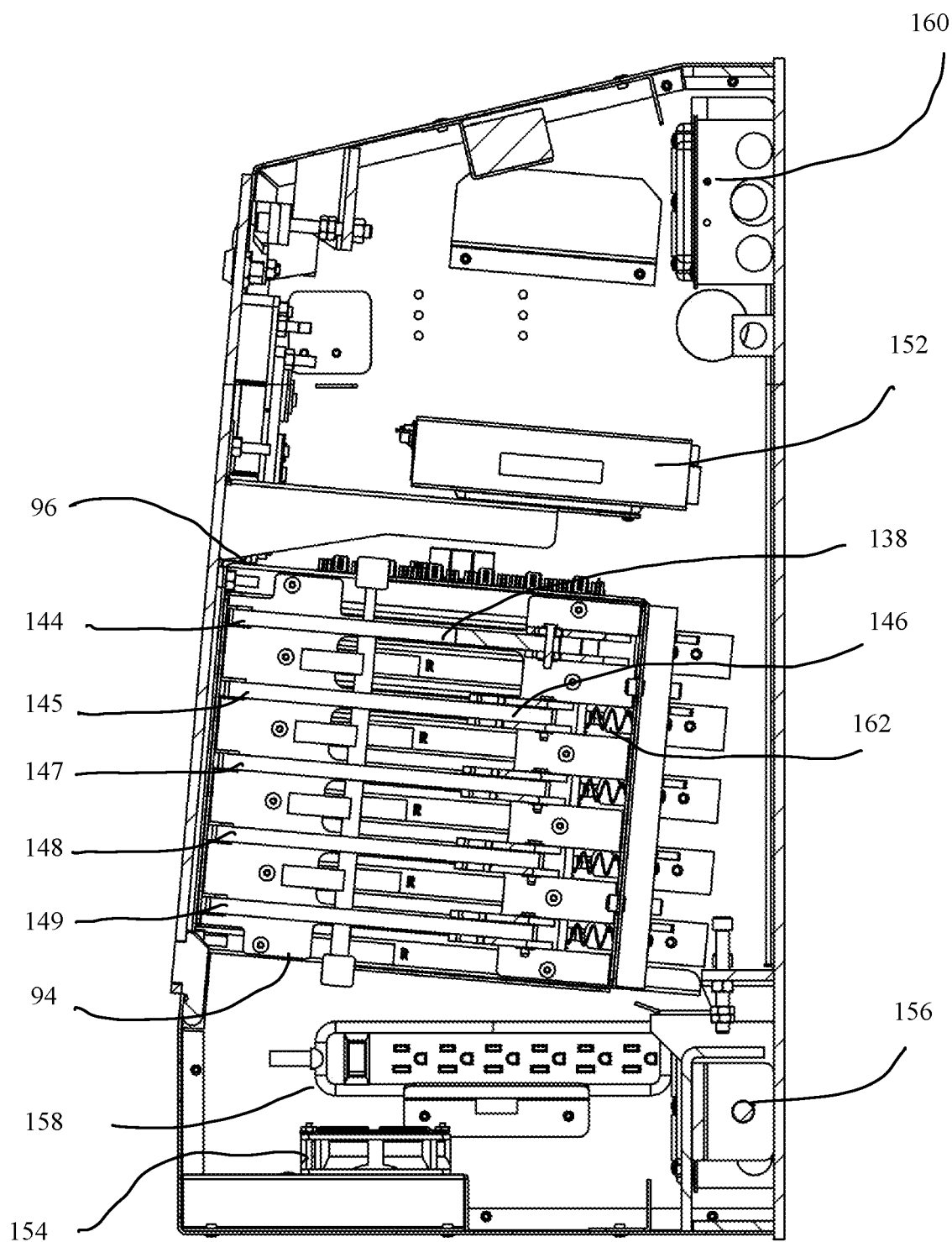
FIG. 4 is a right side sectional view thereof.

FIGS. 1-2 show environmental views of one embodiment of the charging system 100 for storage and charging of mobile computing devices 138, 146, including but not limited to a tablet. The charging system 100 provides a housing 102 that stores and secures a mobile computing device 138, 146 as shown in FIGS. 1 and 4. The housing 102 restricts access to the devices inserted into the storage apertures. The charging system 100 has been described as operating for a mobile computing device. The mobile computing devices may include, but are not limited to, tablets, smart phones, iPads, iPods, iPhones, Android devices, televisions, DVD playback devices, Raspberry Pi, Arduino device, radios, MP3 players, wearable devices, fitness trackers, digital audio players, and digital media players. The charging system 100 simplifies the process of charging the devices by removing the need to insert a plug into the port of the device to charge.

Most devices, such as tablets, provide a port for accepting a charger. The port may accept USB, USB micro, USB mini, Lightning, or any other electrical insertion connection. In one embodiment, a charging adapter as taught by U.S. Pat. Nos. 9,917,455 and 10,225,734 inserts into the port of the device, which is hereby incorporated by reference. The case secures the charging adapter within the port. The charging adapter provides two conductive contacts that provide power to the battery of the device.

The charging system 100 provides a housing 102 to store the electronic devices 146, 148 and at least one, preferably multiple, charging locations within the housing 102. The user inserts an electronic device, such as a tablet, into the housing 102 at the storage apertures 112, 120, 122, 124, 126, 128, 130, 132, 134, 136. The charging locations are located within the storage apertures 112, 120, 122, 124, 126, 128, 130, 132, 134, 136.

The storage apertures 112, 120, 122, 124, 126, 128, 130, 132, 134, 136 are located within the front wall 118 of the housing 102. The front wall 118 of one embodiment opens from the housing 102 to provide access within the housing 102. The front wall 118 pivotally attaches to the housing at pivotal attachments 114, 116, such as hinges. Locks 104, 106 secure the front wall 118 in the locked position to limit opening of the housing 102 at the front wall. Unlocking locks 104, 106 enables opening of the front wall 118 to access the housing 102.

The housing 102 provides display 110 that provides the user with information. The display 110 provides the user with a touch screen that enables the user to access the charging station as a kiosk. The display 110 allows the user to request a device and to enter commands and information to the storage system 100. The display 110 communicates with the user. The user can request access to a device using the display 110.

The user may use the display for conferencing, phone calls, video conferencing, accessing information, or other communication. In one embodiment, the user may enter complaints, grievances, or other communication into the touch screen 110. Receiver 108 provides a microphone and speaker to allow the user to communicate. The receiver 108 may be used for the communication, including but not limited to, conferencing, phone calls, video conferencing, accessing information, or other communication.

The controller allows the user to access the charging system as a computer system. The user can access the display 110 as a law library, access the Internet, enter text communications, and access other data. The user may also use the display for video conferencing, text communication, emails, or other communication. The user may also enter complaints, report violations, report misuse of the devices, and report damage to the devices.

Authorized users, including facility personnel, administrators, and other authorized users may also use the display 110, such as a touch screen, for administrative and maintenance purposes. The administrative and maintenance purposes may include, but are not limited to:
- checking status of devices;
- identifying which users have the devices;
- identifying damaged devices;
- limiting access to the devices;
- creating rules for usage of the devices;
- restricting usage of the devices;
- enabling/disabling network access to the devices;
- updating devices;
- updating software;
- granting access for maintaining devices; and
- turning on/off the devices.

The display 110 is constructed to withstand damage. The display provides a display and a touch film. A polycarbonate layer is placed inside of the touch film. The polycarbonate layer protects the display.

FIG. 2 shows the storage of devices 138, 146, such as tablets, within the housing 102. The devices insert into the storage apertures 112, 120, 122, 124, 126, 128, 130, 132, 134, 136. As shown in FIGS. 1 and 2, supports 111, 113 are located within each storage aperture. The supports 111, 113 support the device within each aperture 112, 120, 122, 124, 126, 128, 130, 132, 134, 136. Each device rests upon the supports 111, 113 within each aperture 112, 120, 122, 124, 126, 128, 130, 132, 134, 136.

In one embodiment, the storage apertures 112, 120, 122, 124, 126, 128, 130, 132, 134, 136 are keyed for the devices. The storage apertures 112, 120, 122, 124, 126, 128, 130, 132, 134, 136 direct insertion of the devices in the proper orientation with the charger. The storage apertures 112, 120, 122, 124, 126, 128, 130, 132, 134, 136 limit insertion of the computing devices to orient the computing device with the charging devices and communication devices in the housing. Inserting the device in the wrong orientation could prevent charging of the device and could prevent locking of the device within the housing 102.

Figure 3:
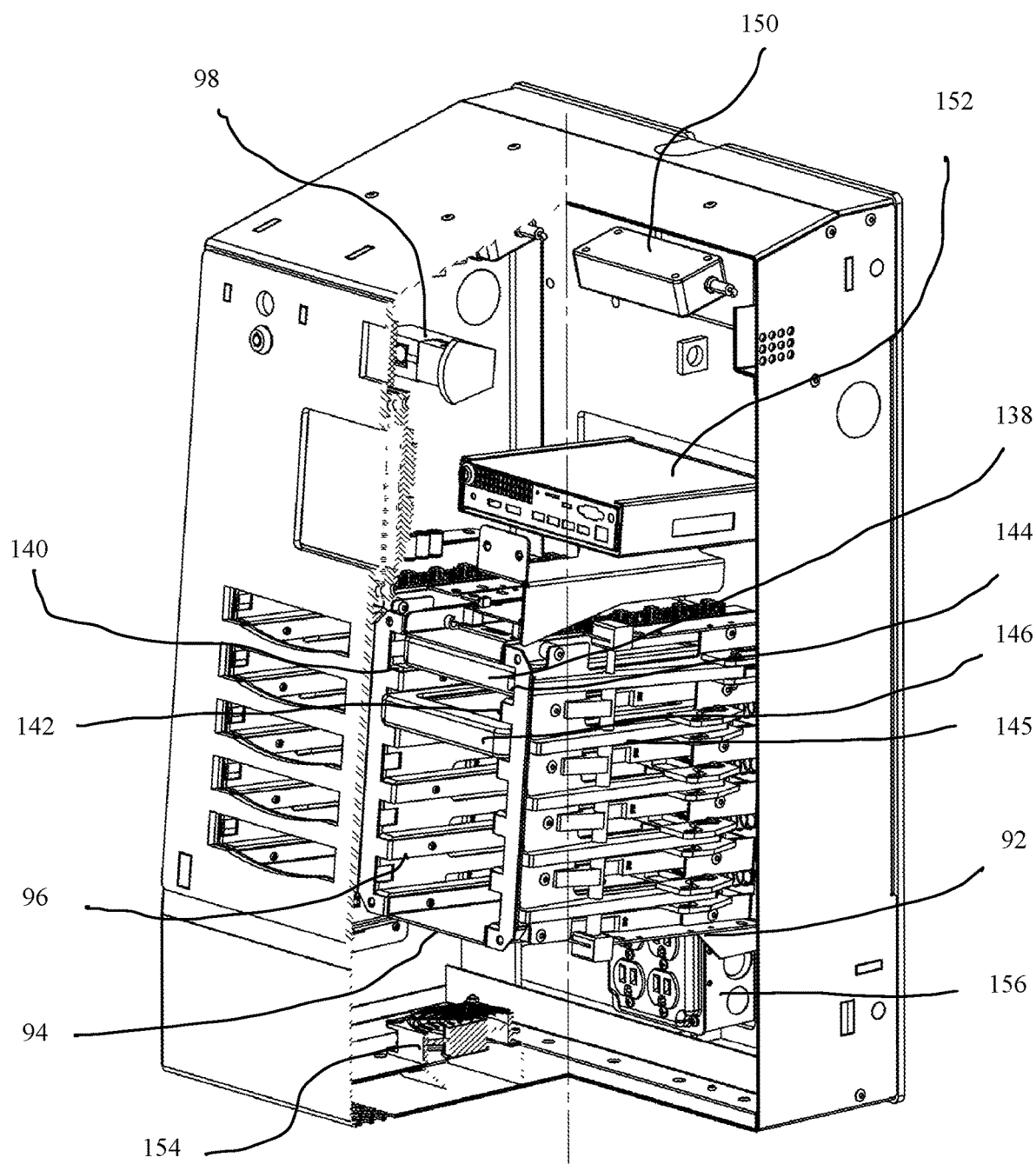
FIG. 3 is a sectional view thereof.

FIGS. 2 and 3 show the devices 138, 146 within storage apertures 128, 130. Device 138 is secured within storage aperture 128. Blocking arm 144 secures the device 138 within the storage aperture 128 by limiting removal of the device 138. Device 146 is released from the blocking arm. The user may remove the device 146 from the housing 102 and the storage system 100.

In one embodiment, the storage system charges the device 138. In another embodiment, the storage system applies rules to determine charging of the device 138.

Another embodiment provides wireless charging that allows charging of the devices within the housing. Such wireless charging may be implemented in the storage locations within the housing. Different wireless chargers may be located throughout the housing or on the platforms at which the devices are stored.

FIGS. 3 and 4 shows the internal components of the housing 102. Such internal components include camera 98, controller 152, power adapter 150, fan 154, and outlets 156. The camera 98 captures images of users accessing the tablets within the housing 102. The camera 98 may biometrically identify users for verifying the user's identity.

The camera 98 of one embodiment captures an image of the user accessing the devices. The controller may then authenticate the user. The controller may also store an image of the user accessing the device and returning the device. The camera 98 may also capture an image of the device to identify the device or identify any damage to the device. The camera 98 may also be implemented for video conferencing.

The camera 98, power adapter 150, controller 152, fan 154, and power outlets 156, 158 are elevated above the floor of the housing 102. The housing directs fluids away from the camera 98, power adapter 150 computer system 152, fan 154, and power outlets 156.

The devices 138, 146 are inserted into the charging unit 96 onto supports 111, 113, 140, 142. Supports 111, 113, 140, 142 angle downwards to store the devices 138, 146 not level. The supports 111, 113, 140, 142 for each storage aperture 112, 120, 122, 124, 126, 128, 130, 132, 134, 136 angle downwards. The downward angle of supports 111, 113 drains liquids that may be poured into the insertion apertures 112, 120, 122, 124, 126, 128, 130, 132, 134, 136. The downward angle of supports 111, 113 directs debris inserted into the insertion apertures 112, 120, 122, 124, 126, 128, 130, 132, 134, 136 downward off of supports 111, 113 and the devices within the storage apertures 112, 120, 122, 124, 126, 128, 130, 132, 134, 136.

Unlevel storage of the devices within the storage apertures 112, 120, 122, 124, 126, 128, 130, 132, 134, 136 directs liquids and other debris to flow away from the devices to limit the fluid/debris exposed to the devices stored in the storage apertures 112, 120, 122, 124, 126, 128, 130, 132, 134, 136.

The charging unit 96 secures to the front wall 118. The charging unit 96 provides the supports, chargers, and the storage apertures 112, 120, 122, 124, 126, 128, 130, 132, 134, 136 into which the devices are placed and stored. The top wall of the charging unit 96 limits the amount of liquids and debris that can reach components stored above the charging unit 96. The bottom 94 of the charging unit 96 limits the amount of liquids and debris that can reach components stored below the charging unit 96.

Top wall of the charging unit 96 protects components including, but not limited to the camera 98, controller 152, and power adapter 150. The protection provided by the top wall 126 limits damage to the components above the top wall.

Bottom 94 forms a lower surface of the charging unit 96. Bottom 94 protects components including fan 154 and power outlets 156, 158. Bottom 94 limits fluids and other debris inserted through the storage apertures 112, 120, 122, 124, 126, 128, 130, 132, 134, 136 from reaching the components below the bottom 94 of the charging unit 96. The protection provided by the charging unit 96 limits damage to the components within the housing 102.

Bottom 94 extends towards the rear of the housing 102. The bottom 94 also angles downwards. The bottom 94 directs fluids and debris away from the components. Shield 92 extends from the rear of the housing 102 forwards toward the storage apertures 112, 120, 122, 124, 126, 128, 130, 132, 134, 136. The bottom 94 overlaps with the shield 92. The bottom 94 directs liquid and debris to the shield 92. The shield 92 extends over the component(s) to be protected, such as power source.

The charging unit 96 secures to the housing 102. Blocking arms secured to the housing 102 and the charging unit 94 secure the devices 138, 140 within the housing 102. A blocking arm 144 adjusted to the lock position secures device 138 within the housing. The blocking arm 144 in the locked position limits removal of the device 138 from the housing.

Device 146 has been released from the storage and housing 102. The blocking arm for device 146 has been adjusted to the release position. A biasing mechanism, such as a spring, pushes the device 146 outwards from the housing for accessing the device 146.

FIG. 4 shows the charging unit 96 with devices 138, 146 within the charging unit 96 and housing 102. Blocking arms 144, 145, 147, 148, 149 are associated with each storage aperture 112, 120, 122, 124, 126, 128, 130, 132, 134, 136 to secure the devices within the corresponding storage aperture. Each blocking arm 144, 145, 147, 148, 149 adjusts independently for individually releasing or locking the devices within the storage apertures 112, 120, 122, 124, 126, 128, 130, 132, 134, 136.

Blocking arms 144, 145, 147, 148, 149 within the housing 102 limit access of the devices. Blocking arms 144, 145, 147, 148, 149 secure the devices within the housing 102. The devices are inserted within the storage apertures 112, 120, 122, 124, 126, 128, 130, 132, 134, 136. Users insert and remove the devices 138, 146 via the storage apertures 112, 120, 122, 124, 126, 128, 130, 132, 134, 136. The housing 102 may provide multiple storages apertures that accept and release the devices.

Inserting the device, such as the devices 138, 146, into the housing 102 at one of the storage apertures 112, 120, 122, 124, 126, 128, 130, 132, 134, 136 enables charging of the device 138. The device 138 contacts conductive contacts of the charger to charge the device.

Figure 5:
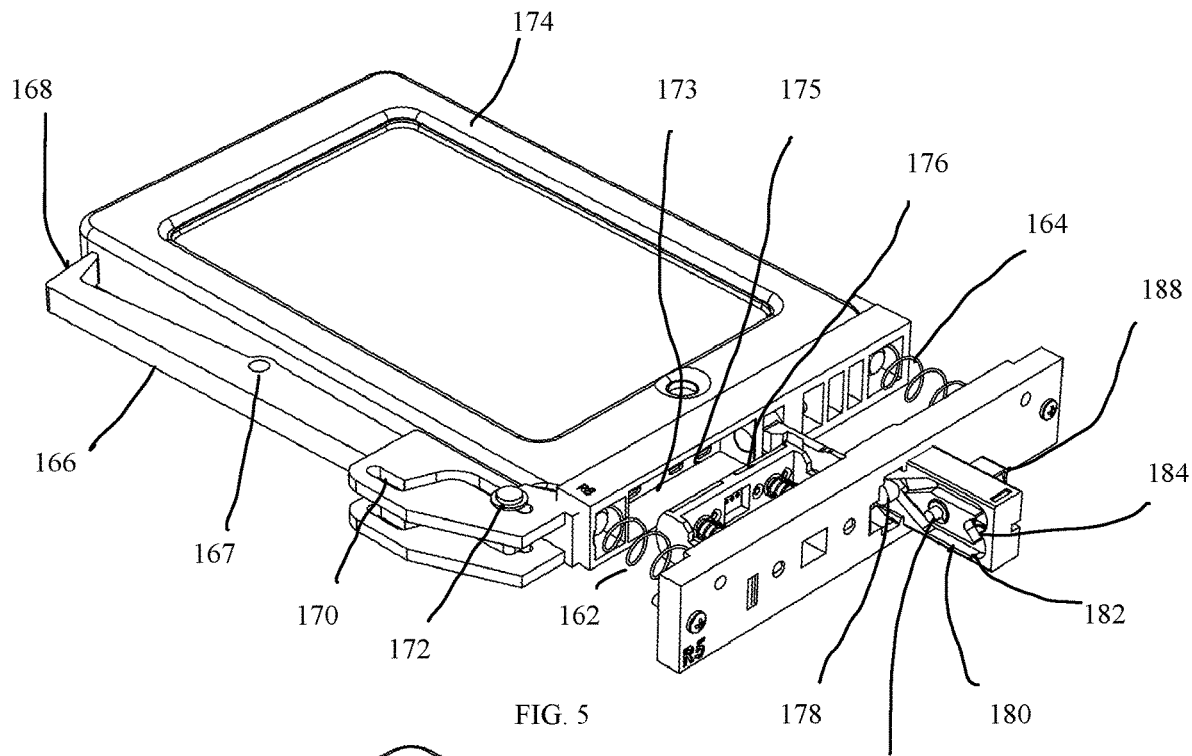
FIG. 5 is a top rear perspective view of the charging assembly of one embodiment of the present invention.
Figure 6:
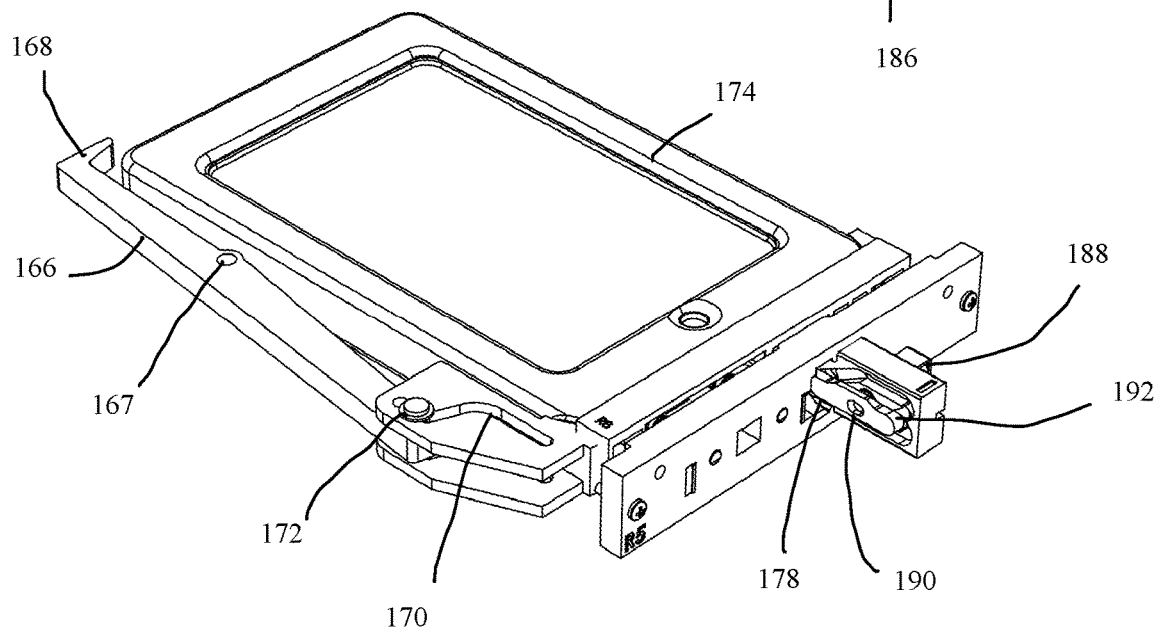
FIG. 6 is a top rear perspective view thereof.

As shown in FIGS. 4-6, the blocking arm secures and releases the devices from the storage apertures 112, 120, 122, 124, 126, 128, 130, 132, 134, 136. Upon adjusting the locking arm 178 to the release position, biasing device 162, such as a spring, pushes the device 146 away from the charger and towards the exit of the storage aperture.

FIG. 5 shows the release of device 174. Blocking arm 166 extends longitudinally with the device 174. Blocking finger 168 extends laterally from a longitudinal end of the blocking arm 166. The blocking finger 168 adjusted to the release position allows longitudinal movement of the device 174. The device 174 can exit the housing as the blocking finger 168 does not obstruct longitudinal movement of the device 174 to exit the storage aperture.

A positioning finger 172 is located at a second longitudinal end of the blocking arm 166. The positioning finger 172 secures the blocking arm 166 to the receiver at the positioning track 170. Movement of the positioning finger 172 through the positioning track 170 adjusts blocking arm 166 between the release position shown in FIG. 5 and the locked position shown in FIG. 6. Pivot 167 secures the blocking arm 166 to the charging unit. The pivot creates the lateral movement of blocking finger 168 for releasing the device 174 as shown in FIGS. 5 and 6.

Biasing mechanisms 162, 164, such as springs, push the receiver away from the locking base. Movement of the receiver causes the travel of the positioning finger 172 through the positioning track 170. The positioning track 170 extends both longitudinally and laterally. The lateral movement of the positioning finger 172 creates the lateral movement of the blocking finger 168. The blocking arm secures to the receiver at the positioning finger 172.

The receiver provides charging opening 173 for charging and communicating with the device 174 via the charging body 176. Charging body 176 includes chargers and conducting contacts for charging and/or communicating with the device. Charging body 176 secures to the locking base. Biasing mechanisms, such as springs, bias the charging body away from the locking base towards the charging opening 173 at which the devices are inserted into the storage apertures.

Locking arm 178 secured to the receiver locks the receiver with the locking base. The locking arm 178 travels through locking track 182 to the locking position 184 in the locking track 182. The locking body 180 defines the locking track 182 with the locking position 184. The locking track 182 limits movement of the locking arm 178 through the track to an unlocked position shown in FIG. 5 and a locked position shown in FIG. 6.

An actuator body 186 of an actuator 188, such as a solenoid, inserts into a locking aperture of the locking arm 178. The actuator body 186 inserted into the locking aperture maintains the locking arm 178 in the locked position as shown in FIG. 6. The actuator body 186 also releases the locking arm 178. The actuator body 186 withdraws from the locking aperture to release the locking arm 178. The user may then push in the device 174 to release the device. Pushing in the device 178 directs the locking arm 178 out of the locking position 184 within the locking track 182.

The actuator 188 provides fail safe locking. The actuator 188 defaults to the locking position to maintain the position of the locking finger. The actuator body extends into the locking aperture of the locking finger in the event of a power failure. The actuator continues to lock the locking arm.

FIG. 6 shows the device 174 secured within the housing by blocking arm 166. Blocking finger 168 extends laterally across the device 174 to limit longitudinal movement of the device 174 out of the housing. Blocking arm 166 secures to the charging unit and housing at pivot 167. Pivot 167 enables lateral movement of the blocking finger 168 from the locked position shown in FIG. 6 to the released position shown in FIG. 5.

Positioning finger 172 secured to the blocking arm 166 travels through positioning track 170. Due to pivot secured in a fixed position to the housing and charging unit, the positioning finger 172 adjusts the position of the blocking finger 168. The positioning track 170 adjusts the blocking finger 168 laterally. The positioning finger 172 travels between two laterally offset positions through the positioning track 170. The positioning track 170 provides a locked position and a released position that are laterally offset. The lateral offset adjusts the positioning of the blocking finger 168 for releasing and securing the device 174.

FIG. 6 shows the device 174 secured within the charging unit for charging. The chargers are contacting the conductive contacts of the device 174. The contact with the conductive contacts also allows communication between the controller and the device 174. Locking finger 192 of the locking arm 178 inserts into the locking position 184 of the locking track. Biasing devices bias and maintain the locking finger 192 into the locking position 184. An external force, such as the user pushing the device into the receiving aperture, directs the blocking finger 192 out of the locking position 184 to travel through the locking track.

An actuator body 188 inserts into the lock aperture 190 of the locking arm 178 when the locking finger 192 is in the locked position. Insertion of the actuator body 188 into the lock aperture 190 limits movement of the locking finger 178. The actuator body 188 inserted in the lock aperture 190 limits movement of the blocking finger 168. Removal of the actuator body 188 from the lock aperture allows movement of the locking finger 178.

Figure 7:
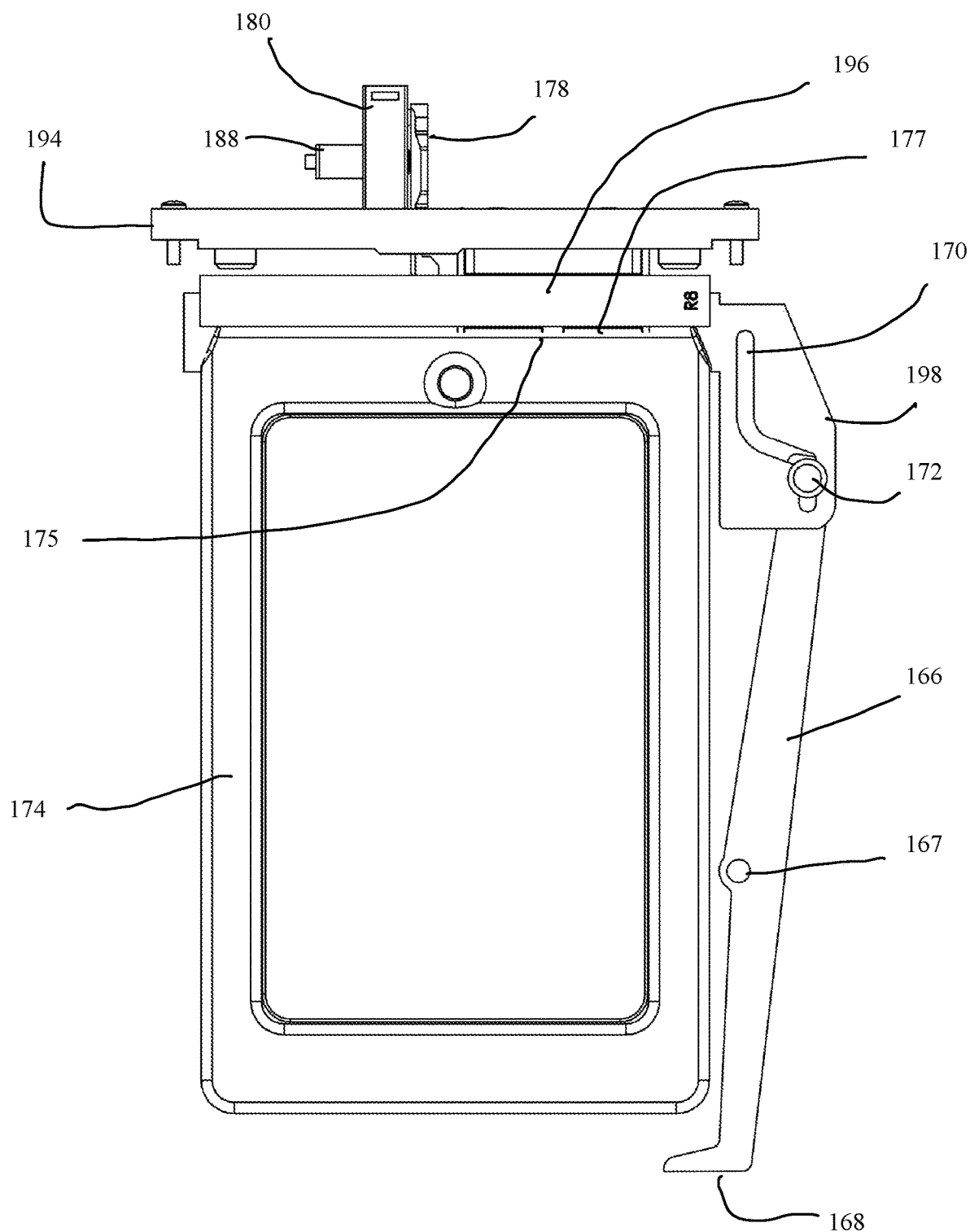
FIG. 7 is a top view thereof.
Figure 8:
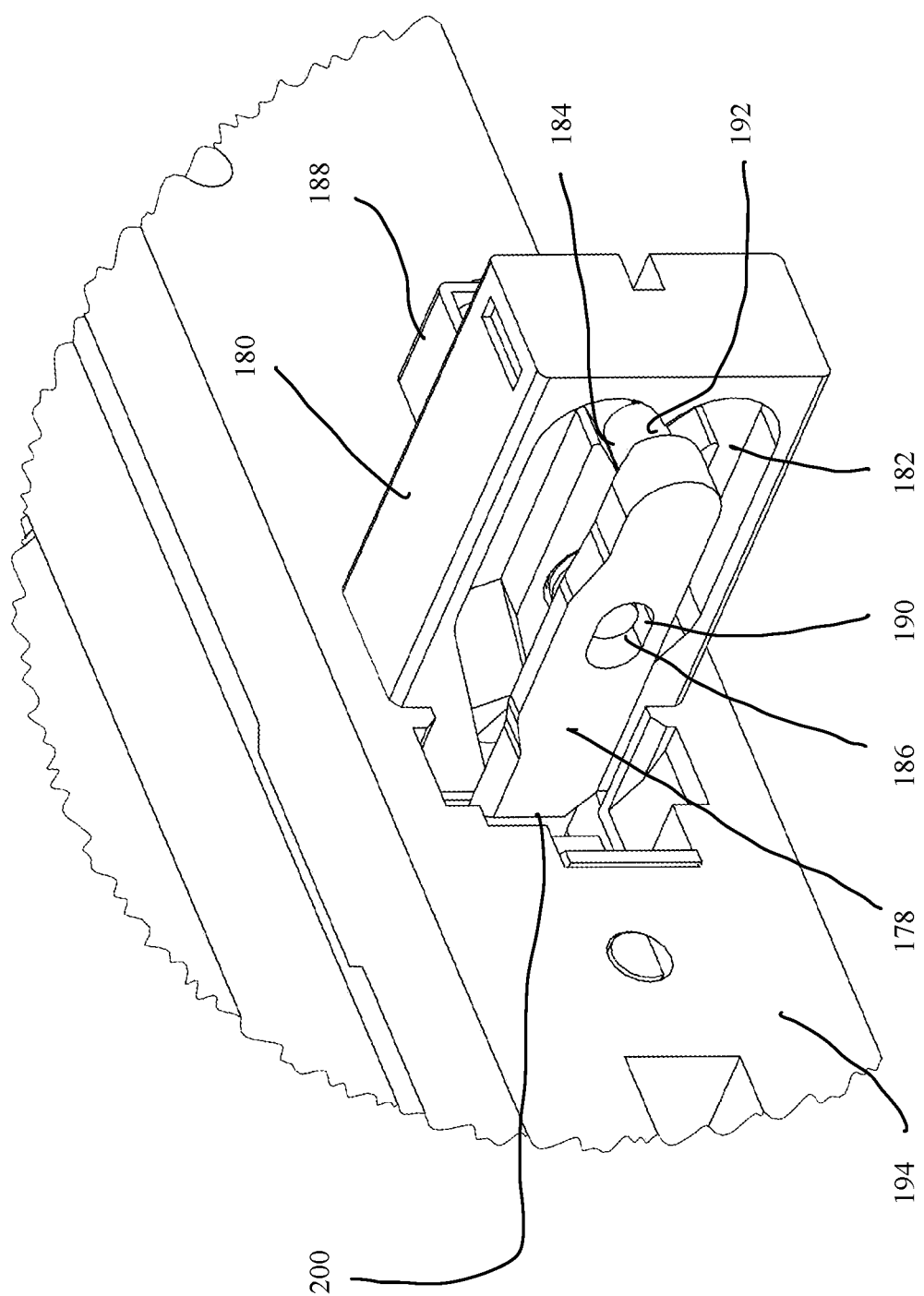
FIG. 8 is a rear sectional view thereof.

FIGS. 7 and 8 show the blocking finger 168 limit the longitudinal movement of the device 174. Blocking finger 168 extends laterally across a longitudinal end of the device to limit movement of the device 174. Blocking arm 166 extends longitudinally. Pivot 167 secures the blocking arm 166 to the housing and the charging unit. Pivot 167 limits longitudinal movement of the blocking arm 166 while allowing lateral movement of the ends of the blocking finger 168.

Blocking finger 168 is located on a first end of the blocking arm 166. Positioning finger 172 is located towards a second end of the blocking arm 166. Pivot 167 is located between the blocking finger 168 and the position finger 172. Blocking finger 168 is located on an opposite side of the pivot 167 as the positioning finger 172.

Figure 10:
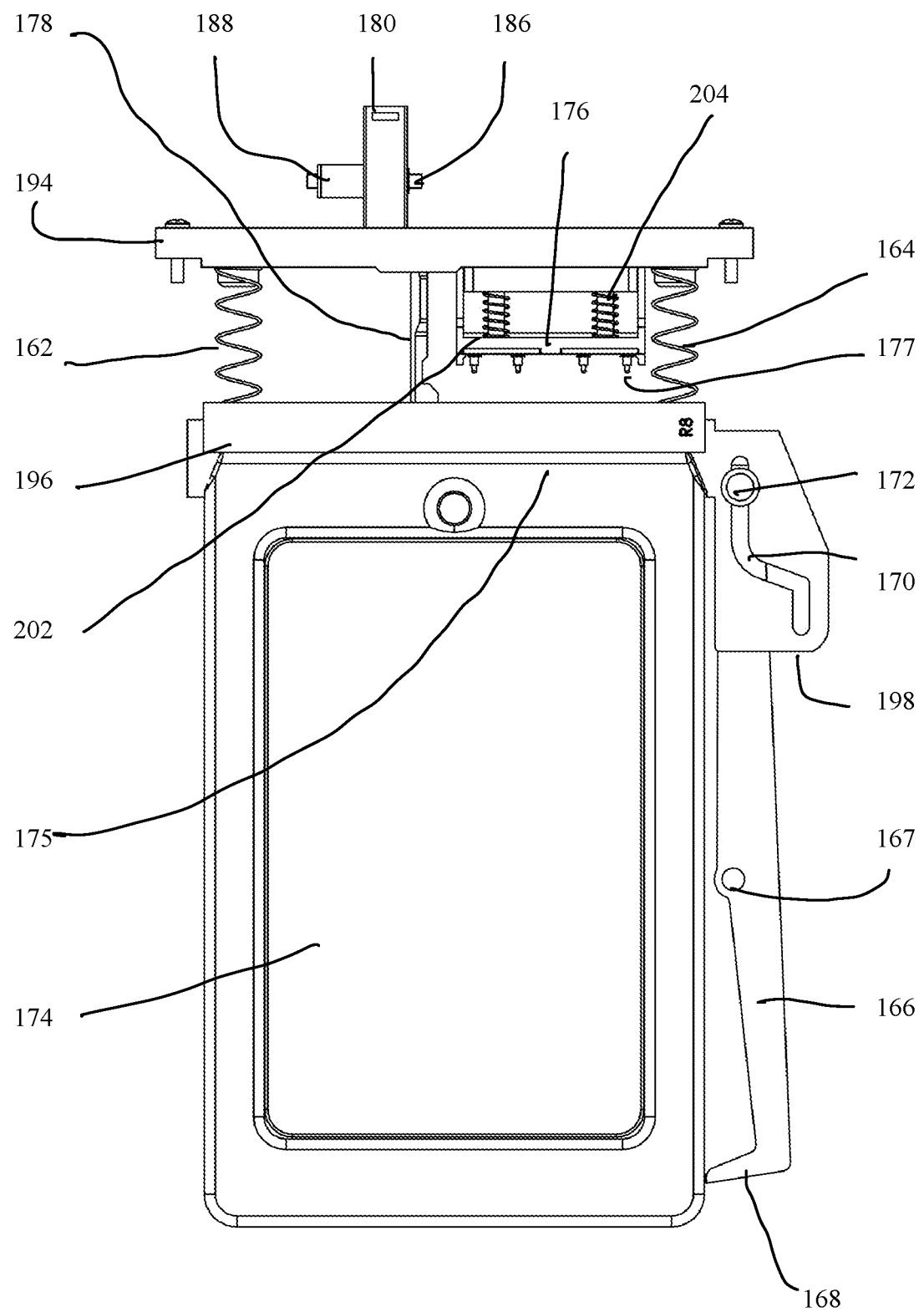
FIG. 10 is a top view thereof.
Figure 11:
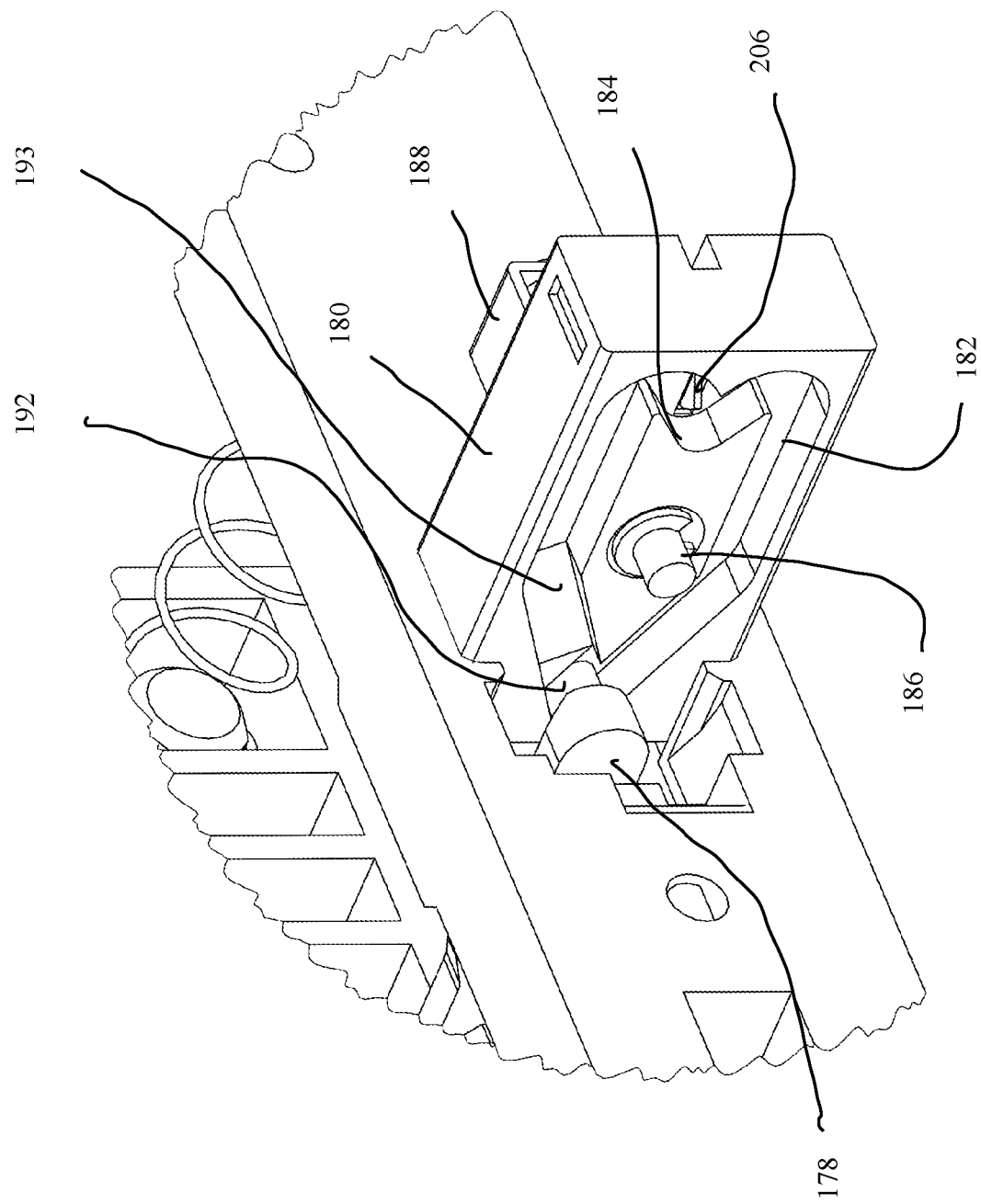
FIG. 11 is a rear sectional view thereof.

Positioning finger 172 travels between two laterally offset positions through the positioning track 170. FIGS. 7 and 8 show the positioning finger 172 in the locked position. FIGS. 10 and 11 show the positioning finger 172 in the release position. The locked position of the positioning finger 172 shown in FIGS. 7 and 8 is laterally offset from the release position of the locking finger 172 shown in FIGS. 10 and 11. Shifting the positioning finger 172 laterally away from the device 174 adjusts the blocking finger 168 laterally towards the device 174 to limit longitudinal movement of the device 174.

The system of one embodiment monitors unauthorized removal and attempted removal of the devices from the housing and the storage apertures. The controller monitors unauthorized/attempted removal of the devices from the storage apertures by monitoring movement of the blocking finger, the locking finger, and/or the actual devices. Device detector 206 shown in FIGS. 9 and 11, such as a switch, monitors position of the blocking finger and the locking finger. Movement of locking finger 192 off of the device detector 206 indicates movement of the blocking finger and the locking finger. If the controller has not approved release of a device, movement of the locking finger from the device detector 206 indicates unauthorized removal or attempted removal.

The controller may also communicate with other detection devices/systems including, but not limited to photo eye(s), camera(s), IR Beam detection system(s), and other detector(s). The detection devices are positioned to monitor the position of the blocking finger, locking finger, and the area within the storage aperture at which the device is secured. The controller identifies unauthorized removal and/or attempted removal of the devices by detecting the positioning of the blocking finger, locking finger, and/or the devices. If the controller has not authorized removal of a device, any movement of the blocking finger from the blocking position, the locking finger from the locking position, and/or the devices from the storage aperture indicates unauthorized removal or attempted removal of the device(s) from the housing.

Unauthorized removal and/or attempted removal of the devices from the housing may trigger actions by the controller and the housing. Upon detecting adjustment of the blocking finger or locking finger or detecting an empty space at a storage aperture at which a device should be located, the controller may trigger such actions. The controller may alert users and personnel. The controller may also limit access to the devices and functionality of the devices. Such actions may include but are not limited to: triggering an alert, such as an alarm, message, communication, or other warning; disabling the devices;

disabling network access to the devices;
  capturing image from the camera of the housing (take picture) as evidence of user accessing or attempting to access the device;
  adjusting a protective screen to cover the storage apertures to block access into the storage apertures; and
  activating an alarm.

When secured to the charging unit, the device 174 charges and communicates with the controller of the charging station. Conductive contacts 175 of the device 174 contact conductive contacts 177 of the charging unit. The conductive contacts 175, 177 charge the devices 174. The device 174 may also communicate with the controller as the conductive contacts 175, 177 transmit data between the controller and the device 174. Conductive contacts 175, 177 update the device, identify the device, check the status of the device, and run diagnostics on the device The conductive contacts 175, 177 provide conductive contacts and data contacts that charge the devices and transfer data between the charging system, the controller, the server, and the electronic devices. Another embodiment wirelessly charges the devices and wirelessly transfers data between the controller and/or server and the devices for wireless communication.

Receiver 196 is secured to track body 198 that defines the positioning track 170. Biasing the receiver 196 longitudinally away from the locking base 194 adjusts the blocking finger 168 laterally. Pivot 167 maintains the longitudinal position of the blocking finger 176. The longitudinal movement of the track body 198 and the positioning track 170 laterally adjusts the positioning finger 172 and the blocking finger 168. The longitudinal movement of the receiver away from the locking base creates the lateral movement of the blocking finger 168.

The locking base 194 biases the receiver 196 longitudinally towards the storage apertures when releasing the devices, such as device 174. Actuator 186 is secured to the locking base. The actuator maintains the positioning of the locking finger 178 to secure the locking base 194 with the receiver 196. Conductive contacts 175, 177 contact each other when the locking base 194 is secured with the receiver 196. The locking arm 178 is secured to the receiver 196 for adjusting the position of the receiver 196 in relation to the locking base 194.

Figure 9:
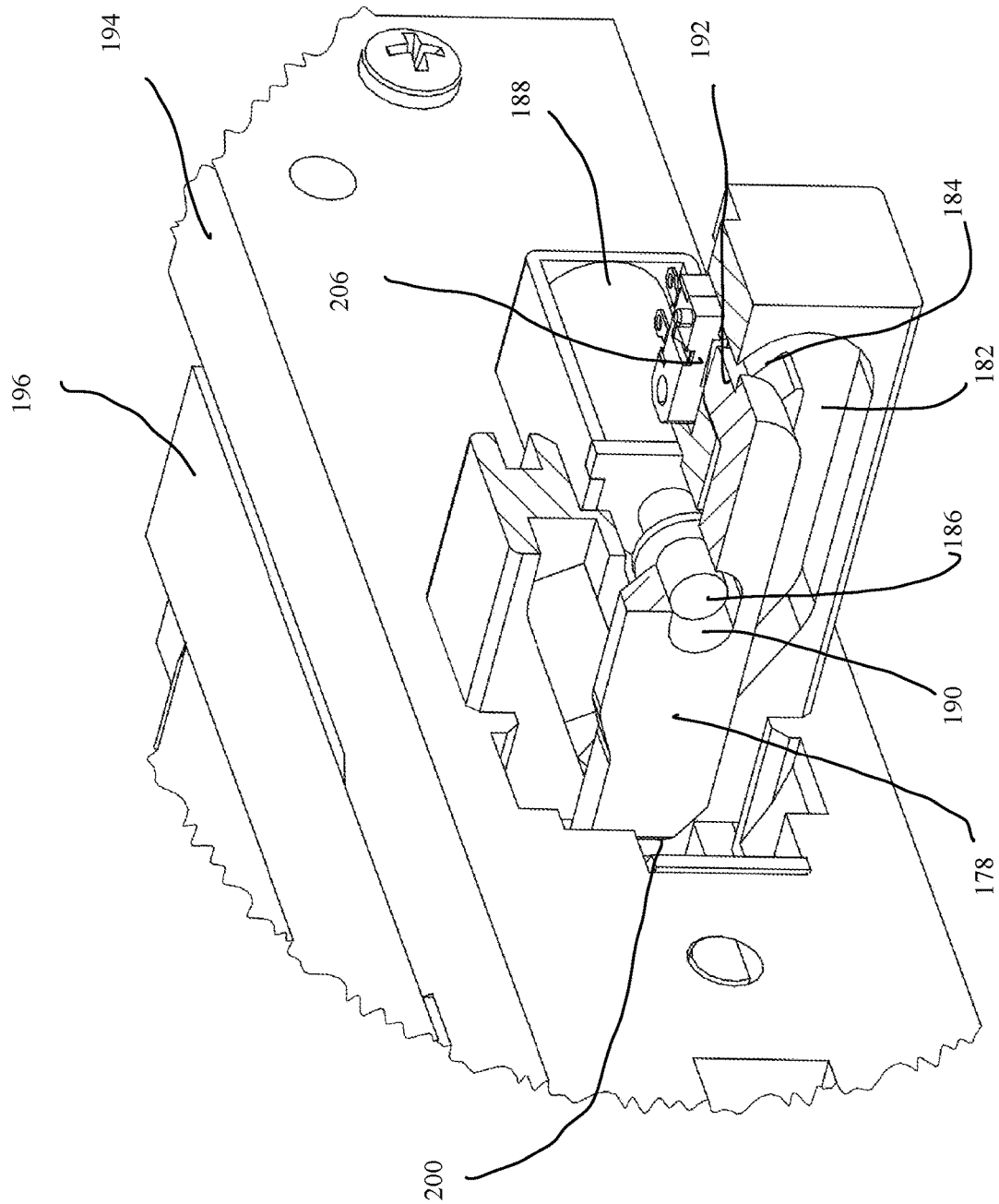
FIG. 9 is a rear sectional view thereof.

FIGS. 8 and 9 provide additional views of the locking arm 178 in relation to the locking body 180 and locking track 182. Locking finger 192 travels through the locking track 182. The locking finger 192 is adjusted into the locking position 184 of the locking track 182. Actuator body 186 is inserted into the locking aperture 190 of the locking finger 178. The locking arm 178 extends longitudinally through the opening 200 of locking base 194 to the receiver 196.

The locking track 182 defines a push/push track for the locking finger 192. The locking finger travels an upper portion of the locking track 182 and a lower portion of the locking track 182. The locking track 182 causes the locking finger 192 to either travel in a counterclockwise direction or a clockwise direction. The locking finger 192 travels in one direction, either clockwise or counterclockwise, to the two stopping locations of the locking track 182, such as the locking position 184 and the release position.

FIG. 9 also shows device detector 206 that detects a device secured within the storage aperture. The device detector 206 may be a switch, sensor, or other device that detects the device within the receiver. The locking finger 192 contacts the device detector 206 to detect the device secured within the storage aperture.

Figure 12:
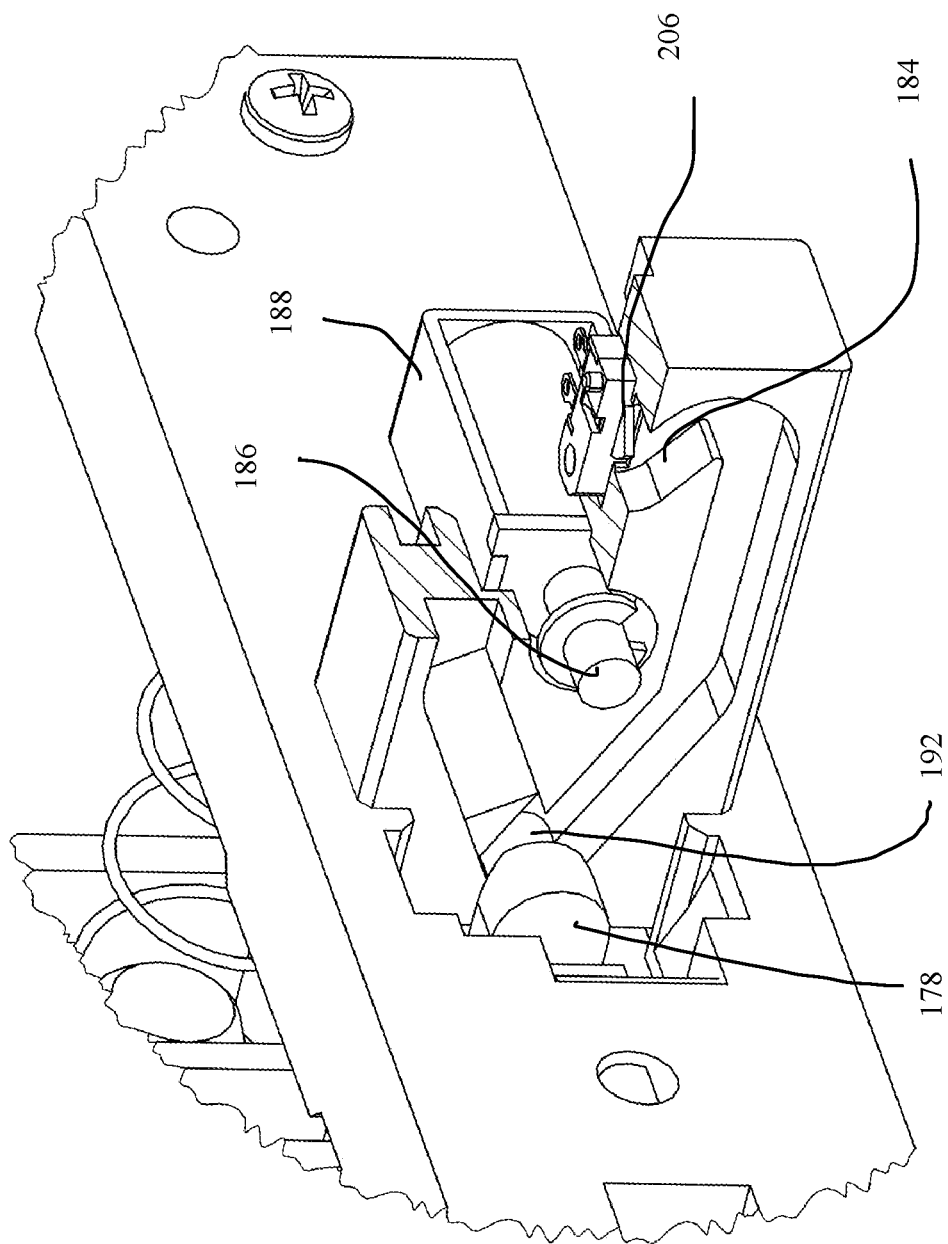
FIG. 12 is a rear sectional view thereof.

FIGS. 10-12 show the device 174 released from the locking base 194. As discussed above, the positioning finger 172 secured to the blocking finger 166 travels in the positioning track 170 for laterally adjusting the blocking finger 168. Pivot 167 maintains the longitudinal position of the blocking arm 166. The receiver 196 and positioning body 198 move longitudinally in relation to the pivot 167 and the blocking arm 166. The locking base 194 and the blocking arm 166 remain fixed in relation to each other. The receiver 196 and charging body 176 are biased longitudinally away from the locking base 194 for movement of the charging body 176.

Securing the locking finger 192 within the locking position secures the charging body 176 and the conductive contacts 177 against the device 174 for communicating with and charging the device 174.

The locking arm 178 controls adjustment of the receiver 196 and charging body 176 in relation to the locking base 194. Biasing devices 162, 164 bias the receiver 196 longitudinally away from the locking base 194. Biasing devices 202, 204 bias the conductive contacts 177 towards the receiver 196 and the device 174. Biasing devices 202, 204 direct the contact between the conductive contacts 175, 177 for charging and communicating between the controller and the devices 174.

The locking arm 178 secures the receiver 196 with locking base 194. As discussed above, the locking arm 178 is positioned within the locking track 182. Pushing the device into the storage aperture pushes the receiver 196 and charging body 176 towards the locking base 194. The locking finger 192 travels through the locking track 182 within the locking body 180. Pushing the receiver 196 towards the locking base 194 directs the locking finger to the locking position within the locking track 182. Actuator body 186 of the actuator 188 inserts into the locking arm to secure the receiver 196 to the locking base 194 as shown in FIGS. 7-9.

Pushing the receiver 196 towards the locking base 194 at the locked position shown in FIG. 7 releases the locking finger 192 from the locked position within the locking track 182. The biasing devices 162, 164 push the receiver 196 and the device 174 longitudinally outwards away from the locking base 194 and towards the exit of the storage aperture.

FIGS. 11 and 12 show the path of the locking finger 192 through the locking track 182. Obstructing body 193 directs the locking finger 192 in the proper direction. When the locking finger is within the locking position 184, the locking finger 192 contacts the detection device 206 to indicate that a tablet is within the storage aperture. Actuator body 186 of the actuator 188 may then insert into the locking aperture of the locking arm 178.

Figure 13:
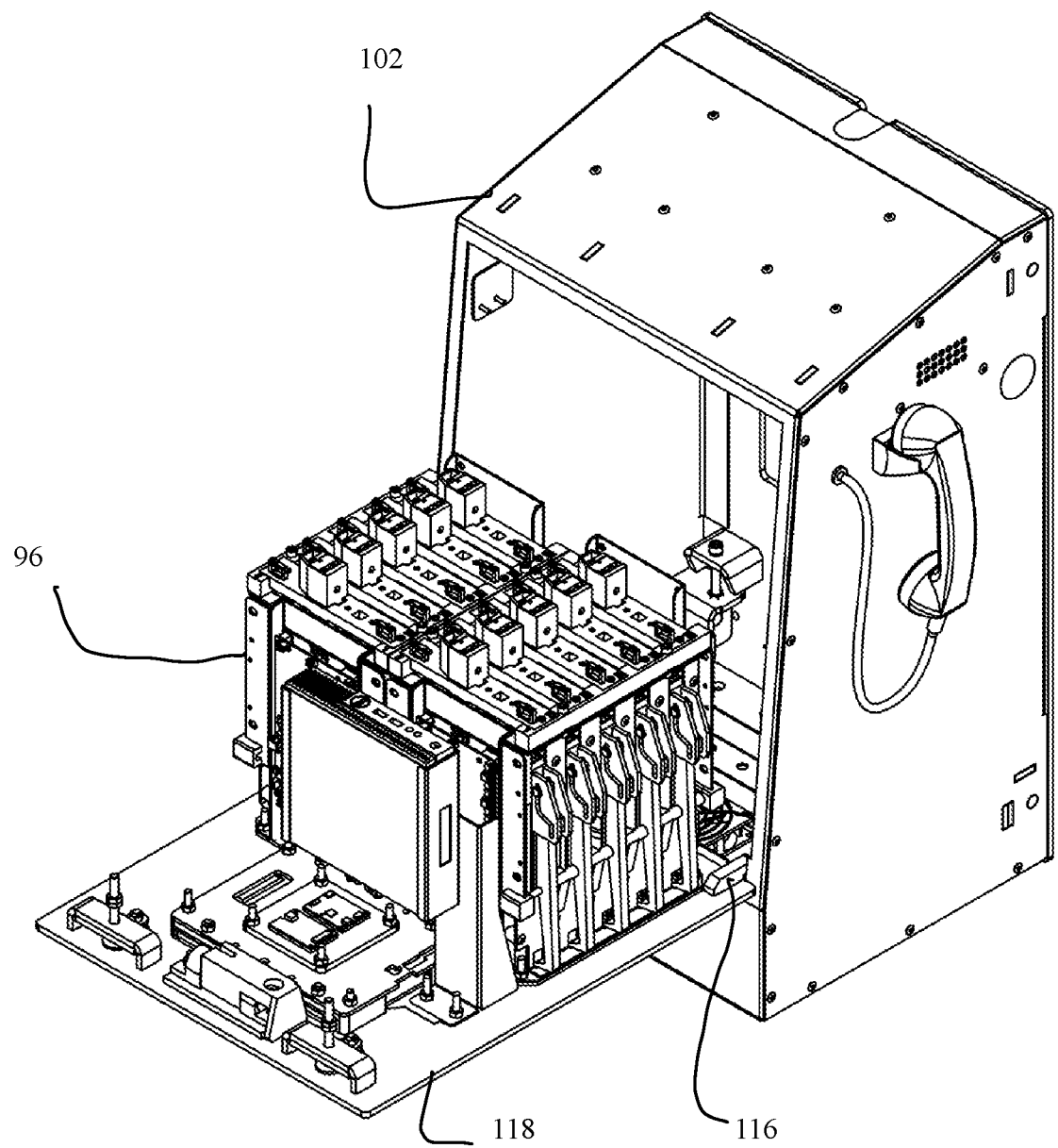
FIG. 13 is a front right perspective thereof.

FIG. 13 shows the modular configuration of the housing 102. Front wall 118 pivotally attaches to the housing 102 at hinges 114, 116 as shown in FIGS. 1 and 13. Front wall 118 pivots downward to open housing 102. Opening the housing 102 at the front wall 118 provides access for servicing the charging system. The charging unit 96 installs onto the front wall 118. The user may remove the charging unit 96 to replace or otherwise repair the charging unit 96.

By providing access into housing 102, the pivotal attachment of the front wall 118 improves access to the internal components of the charging system. Support personnel can access the controller 152 and other components. These components may then be serviced, repaired, or otherwise replaced. Opening the front wall 118 also enables cleaning of the inside of the housing to remove debris and other contaminants within the housing.

The controller 152 has been described above. The controller may be a computer, computing system/device, a processor, server, or other type of computing device. The controller may communicate with a networking device to allow communication between the controller and charging system with a server, the devices, or other computers.

The controller 152 may also communicate wirelessly with the devices through a wireless network, a Bluetooth network, or other communications. The controller may create a wireless network for communication with the devices within the facility.

In one embodiment, the controller locates the position of the devices within the facility. The devices communicate with each other and the controller to triangulate the position of the devices. The network created by the controller locates the different devices within the facility. Locating the device may also identify the location of the user associated with the device.

The controller of one embodiment conducts administrative duties concerning the devices and the usage of the devices. The controller may count the devices, check the status of the devices, apply rules concerning usage and charging of the devices. The controller may also access the devices to identify the location of the devices and the location of the users.

The controller tracks usage of the devices. The controller logs the users that access each device and the users that return each device. The controller confirms that the same user that removed the device also returns the device. The controller tracks usage to identify which user may be responsible for any damage to the device. The controller also tracks the date and time the device is removed from storage and returned to storage.

The controller applies rules for checking out the devices. The rules may be applied to all users or to each individual user. Such rules may deny access due to behavior of the user, the user's failure to return the device, the user damaging a device, and the user has surpassed the allotted time for accessing a device.

The controller may also apply facility wide rules according to no usage of the devices during a specified time, specified areas cannot access the device, specified housing cannot access devices, specified class of user cannot access the device, and insufficient number of devices returned to storage. The controller may limit usage during specified times and may limit to allotted times for each user. The controller also performs the administrative rules for allowing access to the devices.

The controller also detects damage to the devices. Cameras may be installed in each storage aperture to allow the charging system to capture images to detect damage. The charging system may store images of the devices to maintain records of the damage.

Another embodiment may utilize RFID readers installed at the apertures to detect damage. An RFID circuit may be installed on the devices. The RFID circuit may be installed for coverage across the device. A break in the RFID circuit indicates potential damage. The system associates each device with a Device ID. The system also associates each Device ID with an RFID circuit.

The controller detects damage detection by identifying the devices within the storage apertures and not detecting the RFID circuits associated with the devices within the storage apertures. To detect damage, the controller identifies the devices installed within the storage apertures. The RFID reader identifies the RFID circuits within the storage apertures. The controller compares the IDs of the detected devices to the IDs of the RFID circuits detected. The controller designates the devices as damaged if the RFID circuit associated with the devices stored within the storage aperture is not detected by the RFID reader.

The charging system may also check the charging status of the devices or the amperage drawn to charge each device.

The controller 152 may also detect liquid at the conductive bodies, charging bodies, and within the charging unit. The controller may include an amp surge sensor. The amp surge sensor would detect an amperage on the charging lines larger than the defined limit. The increased amperage detected by the controller alerts the system that an issue exists with the chargers or the device at the charger, such as the presence of liquid at the charger or a problem with the device.

The increased amperage detected by the controller may identify issues with the device located at the charger. Such issues may include, but are not limited to a bad battery, a short, an unauthorized device, or other potential issues.

Upon detecting the increased amps at the charger, the controller may disable the charger or all of the chargers. The system may also trigger an alarm, message, or other alert to the appropriate users, including, but not limited to, administrators, personnel, security officers, police, IT personnel, etc.

The controller may also trigger alerts, such as an alarm or a message indicating an issue, such as detection of a liquid by sensors or an issue with the device or charger. The alert may be an audible alert, such as a siren, sound, or other audible signal, a visual alert, such as a light or other visual indicator, or both audible and visual alert. The alert may also be a text message, a message, an email, a digital message, an audible message sent via phone or application, etc.

The alert may indicate the location of the facility at which the housing is located, the location of the housing within the facility, the status of the charging system, the identifier of the housing, the identification of the devices stored within the housing, the status of the devices stored within the housing, and the status of the chargers. The alert may also provide additional information that may be useful to the user, including the condition detected, such as the detection of liquid or increased amps at the charger.

The alert may also allow the user to enable and/or disable the chargers of the housing. The alert may also provide any video or audio of the housing at the time that the liquid was detected. Such video and/or audio may allow the user to identify the person responsible for the liquid within the housing or other issues. A camera and/or microphone may be located within the housing or may be located within the facility aimed at the housing to capture the audio/video of the housing.

The housing may also include a speaker for communication with a resident and/or residents. The housing provides a personal speaker in receiver 108. Such a personal speaker allows personal communication with the resident, such as an inmate. The housing may also include a speaker that allows communication with multiple residents. Such a speaker plays audio through the facility. The facility may send alerts, notifications, announcements, or other communication to residents via the speaker.

The controller then enables the chargers after the situation is resolved. Such resolution may occur when the sensors no longer detect liquid, after a user reactivates the chargers, or that the amperage at the chargers drops within the expected range. The chargers may then charge the devices located at the associated chargers.

As discussed herein, the housing and charging system communicate with and charge the electronic devices via the conductive contacts 177 of each charging body 176 as shown in FIGS. 7 and 10. The conductive contacts communicate with the electronic devices to update, upgrade, identify, and check the status of the devices. The system may apply rules to the devices based upon identification and status of the devices. The system may charge each individual device according to a charging profile via the conductive contacts as discussed below.

The charging system charges the devices. The port for charging and communicating with each device is usually located at the bottom of the device. The conductive contacts of such a device would also be located at the bottom of the device. To complete the circuit, the conductive contacts of the charging unit at each storage aperture protrudes forward towards the storage aperture from the rear of the housing. In one embodiment, the devices are keyed such that the bottom of the device is inserted first.

In one embodiment, an identification system, such as the controller, of the housing communicates with the device to determine the device identifier of each device inserted into the housing. A port of the device provides different pins of the conductive contacts capable of different functions such as charging the battery and transferring data. At least one of these pins, a communication pin, provides a communication path between the device and the conductive contacts. In one embodiment, the controller identifies each device.

A port of the device provides different pins capable of different functions such as charging the battery and transferring data. At least one of these pins, a communication pin, provides a communication path between the device and the housing. In one embodiment, the charger serves as the communication system capable of identifying the device. The charger of one embodiment provides contacts, such as data contacts that communicate with the mobile device through the communication pins of the device. The data contacts of the charger contact the communication pin of the mobile device. The communication system of one embodiment is implemented through the data contact.

The controller communicates with the mobile devices through data contacts of the charger and the communication pin of the device. The controller receives identification data from the device. The controller determines the identification of the device. The controller then instructs which devices to charge and which devices to release to specified users.

The conductive contacts and orientations have been shown in one manner as shown. The placement of the conductive contacts may vary according to the placement of the conductive contacts on the device, orientation of the insertion aperture, and the travel path of the electronic devices through the housing to the release aperture. The charging station may be configured to accept the electronic device in other orientations that will allow for charging of the device.

The charging station, such as the housing, may also serve as storage of the devices. The devices may be placed into the charging station and then locked within the charging station. Locking the devices in the charging station prevents unauthorized access and securely stores the devices within the charging station.

The charging station may also be implemented as a mobile charging station. Wheels may be attached to the charging station to assist with transporting the devices and the charging station. The wheels increase the mobility of the charging station. A handle may also be attached to the charging station for maneuvering the charging station.

The charging and storage system communicates with a controller, such as a computer, to identify whether a device should be released from the housing. The charging and storage system and controller may communicate wirelessly or through a wired connection. Such communication may also occur across a network or across the Internet. A wireless communication device, including but not limited to NFC, WIFI, Bluetooth, and other wireless devices, may be provided with the housing to allow wireless communication with the controller.

Access to the device secured within the housing may be granted upon certain conditions and/or rules as discussed in U.S. Pat. Nos. 9,917,455; 10,225,734; 10,256,645; and 10,678,302. The system tracks usage of the devices and the status of the user. Such status of the user may be based upon the user's behavior, the user's prior usage of the device, and the user's position in the hierarchy of accessing a device. The controller identifies which users should be granted access to the device. The controller assigns a device to a user. The controller transmits a message to the housing identifying the device to be unlocked for the user. The controller maintains a log of the devices that have been accessed by the users.

To release a device from the base, a user must enter a proper authorization code as shown in U.S. Pat. Nos. 9,917, 455; 10,225,734; 10,256,645; and 10,678,302. The secured storage grants access to the user who provides the proper credentials and identification. The system includes a controller, such as a computer, server, or other computing device, in communication with the charging and storage system. The system requests authorization from the user to access the device from secured storage. The user enters the user's identification and/or password to receive the device. The controller authenticates the user's identification via such authentication methods which include, but are not limited to, password, PIN number, fingerprint, voice recognition, retinal scan, facial recognition, biometrics, or other authentication methods.

The controller determines whether a proper identification has been entered. The controller determines whether a proper user has attempted to access a secure device. If the credential check fails, the system denies the user access to a device. In one embodiment, the system may lock the user out by limiting the number of tries a user can attempt to access the device. The system may require the user to wait a specific amount of time before allowing the user to attempt unlocking the device.

If the user enters a proper identification, the controller then determines whether the user should be allowed access to the device. The controller checks the user and compares the user's identification against a set of rules or other criteria to determine if the system should allow the user access to a device. In one embodiment, the system compares the user's identification to an authorized list of users allowed access to the devices. The system defines rules determining whether to grant the user with access to a device. Such rules can include whether the device belongs to the user or whether the user should be granted access to a device.

The rules can include whether the device is sufficiently charged or in otherwise proper operating condition. The rules can define a minimum charge of the device. If the device is not charged to the minimum charge, the system denies access to the device. Such a charge may be based on the battery power of the device.

The rules may also be based upon rules or guidelines set forth by an institution, a school, a library, a prison, a jail, a detention center, a learning center, a business, a place of learning, or a place of confinement. The system may allow access to the device to users with good behavior, users who have time remaining to access a device, users who have not abused the devices, users who have not damaged devices, users who have not lost or stolen devices, users who have returned devices, or users who have not otherwise abused the system. The system may prevent access to the devices to those users who have poor behavior, users who have no remaining access time for a device, users who have abused the devices, users who have lost or stolen devices, users who have not returned devices, or users who have otherwise abused the system. The system may also deny access to the devices if insufficient devices remain and a user placed higher in the hierarchy is also attempting to access a device.

The system may deny access if a user has exceeded an available access limit. The system defines a set amount of time for which the user can access the device. The system tracks the amount of time a user has accessed the device from the housing. If the user exceeds the available access limit, the controller denies access to the device. The controller confirms that the user has available access time remaining before releasing the device to the user.

The system may also restrict access to certain time periods. If a user attempts to access a device outside of the available access time, the system denies access to the device. The system will allow access to the devices if the user accesses the device during the available access times.

One embodiment of the present invention provides devices with specific features or limited capabilities. These devices are assigned a specific class. The system grants access to users to devices of a specific class. These classed devices may be restricted for access by only a few users, granted greater access to allow an increased number of users to access devices of the class, or provided for free or low cost. Such classes may be a library class device or communication class device. The controller communicates with the housing to identify which devices of a particular class that the user may access. The controller identifies the user to determine the type of user. The type of user can access devices of a particular class or classes. The controller identifies which classes the user may access and grants the appropriate access. The controller instructs the housing to release a device to which the user has proper access.

The library class may be provided for an inmate law library. Such a library class may be restricted to only a set of users such that users outside of that set cannot access devices in the library class.

The communication class provides a number of devices that are restricted to a more restricted set of inmates. Users outside of the communication class cannot access the devices in the communication class.

During a rule check, the system determines whether the user is approved to access a device. If the rules indicate that a user should not be allowed access, the system denies the user access to a device. The system then requests authorization from a different user. As discussed above, the system may require the user to wait a specific amount of time before allowing the user to attempt unlocking the device.

The controller of one embodiment implements the rules. If the controller restricts a user from accessing a device, the controller instructs the locks not to release the device. The controller sends the message to the locks. In one embodiment, the controller communicates directly with the chargers and the locks. In another embodiment, a server communicates with the chargers and the locks via the controller. The locks then refuse access to the device by not releasing the device.

If the user is allowed access, the system sends a message to the lock indicating that the user is granted access to a device. The message includes an authorization for the user to access a device. In one embodiment, the message identifies a device that is assigned to the user. The message may include the identification of the charger and the location at which the assigned device is stored. The lock may then release the assigned device.

The housing then sends the system a message indicating that the housing has received the message from the system. The message includes confirmation receipt of the message from the controller. The message also includes confirmation that the lock releases the assigned device.

The controller logs release information concerning the unlocked device. The information includes the user who accessed the device, the device ID assigned to the user, and the time that the device was released from the housing. Such information allows administrators, staff, or others to identify which devices have been released. The controller logs the identification of device and the identification of the user who accessed the device from the housing. Such information enables the system to account for which users last accessed a particular device. The institution may then hold users accountable for devices accessed by the users.

The charging system releases the device identified by the controller. In another embodiment, the charging system may assign the device to be released and transmits the device identifier associated with the device so that the controller can log the device identifier and the user who accessed the device. Another embodiment simply tracks and logs the device selected by the user.

The charging system of one embodiment restricts access of the device to authorized users and charges the device. The charging unit provides charging apertures for receiving the mobile devices and positions the devices at the chargers. The charging unit keys the devices for proper insertion of the devices into the charging unit. The charging unit also orients the devices for charging on the chargers and for transferring data with the controller.

The charging system controls each charger individually to allow selective charging of individual devices. For example, the controller may determine that some devices should charge, and other devices should not charge. The charging system activates the chargers associated with the devices to be charged. The housing does not activate the chargers associated with the devices not to be charged.

The devices communicate with the controller and charging system for identification, updates, upgrades, and other modifications as discussed below. The charging system via the conductive contacts 175, 177 can update, upgrade, or otherwise modify devices inserted into the housing. The charging system can identify the device identifiers of the devices that are inserted within the housing and located at the conductive contacts 175, 177 of the chargers. The housing can communicate with each other and the controller to identify the location of the devices and the devices inserted into each housing. The controller can then control charging of the different devices, cease charging through a designated storage aperture, charger, etc. The housings may be placed in different areas of the facility. The controller can then specify the different chargers to charge the devices based upon the location of the housing.

The housings identify the different devices inserted within each housing. The housings report the devices within each housing to the controller. With such information, the controller generates reports identifying the location of the devices, the user identifier of the user who accessed the device, the time of accessing the device, the time of returning the device, and the condition of the device.

Each housing identifies the mobile device inserted into the housing during insertion of the device. The housing identifies the electronic device via a unique device identifier associated with each device. Such device identifiers include but are not limited to a visual indicator, such as a barcode or other visually detected identifier, or an electronic identifier assigned to the device that is accessed from the device. An identification system detects the device identifiers to determine the identification of the device. The identification system may determine the device identifier via a visual identification device, an electronic identification device, a reader, a communication system between the housing and the device, or other detection system that can determine the device identifiers.

The electronic device exchanges identification data with the charging system. Such identification may be detected by the charging system with a visual identification device, including but not limited to a camera, a bar code reader reading a bar code or other identifier on the device, or other visual ID reader. Such visual identification device may be installed within the housing.

In one embodiment, the device exchanges the identification data with the charging system through a communication system. The identification data transfers through a communication system, such as a wireless connection, a wired connection, Bluetooth communication, ultrasonic, light, light pulses, or a contact such as the charging contact or data contact. Other data may also be exchanged through such a communication system. Such data may include software upgrades, configuration profiles, charging profiles, updates, upgrades, and other data.

Upon identifying the device, the housing communicates with a server. In one embodiment, the housing communicates with the server via the controller. The housing submits the identification data of the device, such as the device identifier, to the server. The housing of one embodiment of the present invention also identifies the housing identifier associated with the housing and the charger at which the device is currently charging.

The server may then maintain records of each device that is placed within the housing and the charger at which the device is located. The charging system then controls charging of the device via the conductive contacts 175, 177. Such a housing enables controlled charging of the device even if the device is not connected via the network.

Upon placement of the device at a charger, the housing transmits a charge request to the controller to determine if the charger should charge the device. The charge request provides sufficient information to the controller to identify the housing at which the device is installed, the identifier of the device, and the identifier of the charger that will be charging the device.

In one embodiment, the housing updates the mobile computing devices that have been inserted into the housing. The device may not always be connected to a network to receive updates. Updating the computing device via the housing avoids issues related to being disconnected from the network. The housing receives the updates from the controller. The communication system transfers data between the housing and the device. As discussed above, the communication system transfers data through a physical connection, a wired connection, or a wireless connection.

The data contacts update the device when the device is inserted into the housing and located at the charge position with the data contacts. The housing may receive software upgrades, configuration messages that update configuration profiles for the devices, messages that update the charging profile, and other upgrades, updates, and/or modifications for the devices. The communication system transfers the data from the housing to the device. The device may then communicate with the housing to indicate that the device has been properly updated and/or modified. The housing may then inform the server of the update and/or modification. One embodiment of the controller updates the devices based upon the identity of the device and/or predefined rules.

In one embodiment, the housing and chargers selectively charge devices. The controller instructs the housing to charge specific devices. The housing determines the identification of each device inserted into the housing as discussed above.

The controller determines the identification of the devices. The controller receives identification information from the devices sufficient to determine the location of the device, the device identifier, the charger at which the device is located, and the conductive contacts that will charge the device.

After the controller receives the identification information with the charge request, such as the housing identifier, the device identifier, the charger identifier, and the conductive contacts that will charge the device, the controller compares the secure charge request against charging rules which apply to the specific mobile electronic device. The rules may vary according to the needs of the controlled environment or facility. In one embodiment, the rules are stored within a database. The rules may be stored locally or remotely within storage. If the rules are met, the controller instructs the secure charger to charge the device.

Once the secure charger receives authorization from the controller, the charger activates to charge the mobile device. Electricity flows through the charging conductors between the secure charger and the mobile electronic device for charging the mobile electronic device's battery.

Controlling the charging of the devices enables administrators to control usage of the devices that may not be connected to a network. Administrators may selectively charge devices to control usage of the devices. Without a charge, users cannot use or misuse the devices. Administrators simply stop charging selected devices to limit use of the device. If the unauthorized devices cannot be charged, usage of the unauthorized devices will eventually cease.

The controller may impose rules before charging the device. Such charging rules consider the status of the device, the status of the facility, the environmental status, the user's usage of the device, and other conditions.

The controller and/or the charging system may determine that a device has been damaged or otherwise tampered with. If such a device has been damaged or tampered with, the controller instructs the housing not to charge such a device. The housing may identify damaged devices based upon a visual inspection via the camera.

The housing may also identify damaged and/or tampered devices by identifying devices that no longer properly fit within the housing. Such proper fit may be determined by the ability to insert the electronic device into the housing or storage aperture. If the device does not properly insert into the housing, the device has been tampered with or damaged. The housing will not charge such a device.

Other rules may be directed to the facility status. Such rules may require proper operation conditions to be in place to allow charging. The housing may prevent charging of the devices in riot situations, emergency situations, lock downs, or other unsafe conditions. During such situations, the controller transmits a facility cease charging command that disables the housings' charging capabilities. The administrators may override the facility cease charging command. The housings may be installed in different areas such that the cease charging commands can disable only the housings within a designated area. The cease charging command may be sent to only those bases in the defined zone to be disabled.

Other charging rules implemented by the controller include battery condition rules. Such battery condition rules include stop charging if the temperature within the housing is above a designated temperature, such as 113° F. Avoiding charging at such temperatures prolongs battery life of the device. The housing transmits the temperature at the housing to the controller for the controller to implement the charging rules.

The battery condition rules may also enable or disable charging based upon the charging profile of the battery. If the charger determines an improper charging profile of the battery, the housing may slow charging or disable charging of the device. In most instances, the housing will slow charging to prolong battery life.

The charger may also determine if a battery is not sufficiently charged. In some instances, a device may be returned to the charger with insufficient charge for operation of the device. The charger will then charge the device with enough electricity to identify the device. If an acceptable device identifier is not determined by the time a sufficient charge is acquired by the device or by a predetermined time, the charger will no longer charge the device. Such a charging system eliminates charging of unauthorized devices.

In some embodiments, an administrator inputs charging rules into a controller database using a web form, specifying a rule defining what devices are allowed to charge, the times charging is allowed, and which users the system allows release of devices from the housing. Upon request by the secure charger, the controller uses the predefined rules setup by the administrator to determine whether the mobile electronic device should be charged while connected to the secure charger. In this embodiment, the controller also authenticates end users requesting the release of a mobile electronic device locked in the secure charger and determines whether to release the mobile electronic device based on the rules established by the administrator.

The controller determines that the rules are met to enable charging of the device. The housing charges the device until the device is ready for use. After the device is sufficiently charged, the device enters the rotation to be checked out to authorized users. An authorized user may then check out the device if the controller and housing authorize the user's use of the device.

The present invention also provides a billing system for billing the usage of the devices. The billing system bills the user and the user accounts associated with the users. The user checks out the device from the housing. The controller associates the user with the device to identify the user who has checked out the device for usage. The controller logs the usage of the device by the user. Such logging may include a user identifier, a device identifier, and a time and date that the device was released to the user. The controller may also log the condition of the device at the time that the device was released to the user. The controller may also log the charge percentage of the battery of the device at the time the device is released to the user.

The user must then return the device to a housing. The system will also log the return of the device. The system will log the condition of the device, the charge percentage of the battery of the device, and the date and time that the device is returned. The system then bills the user for the usage of the device. The system may bill based upon the time for which the device was released to the user. Such billing may be based upon the time that the user had the device. The system may also allow for a free period of time. The system grants access the user with access to the device for a limited time without charge. If the user exceeds the free time, the system allows continued access to the device with for a fee. The system bills the user/user account for the continued use of the device.

Such billing may be based upon the class of the device that the user accesses. Some classes of device may be provided at no charge or at a reduced rate. Other classes of devices may be provided to the user at an increased rate. For example, library class devices may be provided at no charge or billed at a lower rate. Devices in the entertainment class may be billed at a higher rate due to the increased features.

Another embodiment may bill the user based upon the power consumption of the device. The system determines the amount the battery has drained while the device is released to the user. The system may also bill upon the amount of electricity required for the device to be charged to the percentage at which the device was released to the user.

The system may also bill the user each time the user checks a device out from the housing. Upon removing the device from the base, the housing instructs the controller that the device has been released a specific user. The billing system then bills the user/user's account for usage of the device due to the release of the device. In another embodiment, the user is billed upon the removal and return of the device to the housing.

The system also generates alerts based upon predefined rules. The rules of one embodiment generates alerts based upon predefined rules stored in the controller. Such rules generate an alert based upon:
 a) Detection of the device not fully inserting into the housing and/or the storage aperture;
 b) Detection of a damaged device;
 c) Detection of a device that has been tampered with;
 d) Detection of a device with no power;
 e) Detection of a device that requires a software upgrade;
 f) Detection of a device requiring an updated configuration profile;
 g) Detection of a device with an inadequate charging profile;
 h) Detection of temperature exceeding a predetermined temperature;
 i) Detection of removal of a device without authorization;
 j) Detection that a device has not been removed from the housing within a predefined time period;
 k) Detection that a device has not been returned to a housing within a predefined time period;
 l) Detection of a device that is not charging or charging improperly;
 m) Detection of a device that is charging above a predefined electrical current;
 and
 n) Detection of an unauthorized device.

The system may generate an alert that is transmitted to the personnel. The controller may then alert personnel of the alert condition that triggered the alert. Such an alert may be a message sent to a cell phone, a computer, a pager, or an audible alarm.

Another embodiment of the present invention provides an audible alarm. The alarm may be installed within a housing or within the facility. The alarm of one embodiment activates if a device is removed without authorization. The alarm alerts the personnel that a device is removed without authorization. In another embodiment, the alarm may activate upon detection of the alert conditions identified above. The system indicates which condition triggered the audible alarm.

One issue in correctional facilities is that inmates tend to be possessive of a particular device. The inmate may intimidate, harass, threaten, or otherwise harm another person for using such a device. For this reason, a device may remain within a housing. The controller identifies mobile devices that have not been removed from the housing for a predetermined amount of time. Such identification alerts the administration that a particular device has been claimed by an inmate such that no one will use the device. The facility may then remedy the situation by pulling the device from rotation or moving the device to an area not accessible to the inmate claiming ownership.

The controller also identifies the mobile electronic devices that have not been returned to the housing within a predefined time period. The controller alerts the administration that a mobile device has not been returned to the housing within the time period. Because the controller can communicate with multiple housings, the controller can check the status of the devices within all of the housings of the facility. The controller of one embodiment generates an alert or an alarm to indicate that the device has not been returned.

In one embodiment, the system deactivates a device that has not been returned to the housing within the predefined time period. The controller instructs the device to deactivate. The controller of one embodiment denies the device access to the network. In another embodiment, the controller sends the instruction to deactivate directly to the device. The device then deactivates until the administrator reactivates the device.

In one embodiment of the present invention, the controller can identify the number of devices within the housing(s) of the facility. The controller can take an inventory to determine if any devices are not installed within the housing(s). The controller can then instruct the housing(s) to lock all devices within the housing(s) until all of the devices are accounted for by being returned to the housing(s). In one embodiment, the controller requires a predefined number of devices to be inserted into the housings before unlocking any of the devices from the housings. The controller instructs the housings to prevent access to the devices. The housings then do not release any devices. The system will allow an administrative override to allow administrators access to devices within the housings.

The housing of one embodiment provides data contacts of the chargers. The data contacts communicate with data contacts of the electronic device. The housing data contact and the device data contact transfer information between the device and the housing. Such data transfer between the housing and the device provides additional control of the devices.

The chargers of one embodiment identify the device identifier associated with each device via the data contacts. Administrators can also update the devices as needed. The housing transfers the data needed to update the device to the device via the device contacts.

Another embodiment of the present invention provides a sanitizing system installed within the housing. The sanitizing system sanitizes, cleans, and/or disinfects the electronic devices. In one embodiment, the sanitizing system cleans the electronic device prior to releasing the device to an authenticated user. The sanitizing system may be implemented on the rules based system described above that applies rules to determine if the device should be released to the authenticated user.

The sanitizing system provides a sanitizer such as a spray unit with nozzles, UV light, or other sanitizer. The spray unit disperses a sanitizing spray, such as a liquid or gel, on the electronic device. The nozzles spray the sanitizing spray on the electronic device.

The sanitizing spray is stored within a reservoir. A pump sprays the sanitizing spray through the nozzles of spray unit onto the electronic devices. Reservoir may supply the spray to each unit or a single unit. Pump is powered by a power source.

Another embodiment may include a brush that contacts the electronic devices to brush the electronic devices. Pump sprays the sanitizing spray through the brush. The brush of one embodiment may include a wick that supplies the sanitizing spray to the brush. In one embodiment, a brush is installed within each charging aperture between which the electronic devices are placed. The brush applies the sanitizing spray to the electronic device and brushes the spray across the device. Reservoir may supply the spray to each brush or a single brush. Pump is powered by a power source.

Another embodiment of the present invention may provide lights, such as UV lights that sanitize the electronic device. Each light is associated with a charging aperture. The lights are oriented to align with the charging aperture with insertion of the electronic device. The lights may be ultraviolet lights or other lights that disinfect the electronic device. Applying the light for a particular amount of time disinfects and/or sanitizes the electronic device.

The controller may control the sanitizing system. The controller may track sanitation of each device. In another embodiment, the housing controls the sanitizing system. The system of one embodiment maintains records indicating that devices have been sanitized and the time of sanitizing the devices. In one embodiment, the system activates an alert if the light or spray system is not functioning due to power failure, bad pump, no sanitizing spray, or non-functioning light. The controller may maintain records of when the devices were sanitized. The controller may also activate an alert for when the sanitizing systems are not functioning properly.

The sanitizing systems may sanitize all charging apertures or may only sanitize those charging apertures occupied by a device. The sanitizing system tracks the device identifier and sanitization records to confirm the sanitation of the devices.

The rules logic system, such as the controller such as a processor, computer, or controller, of one embodiment may require sanitation of the device before releasing the device. The system may lock the device until the device has been sanitized. The system may sanitize the device and release the device or release another device that has been sanitized to the user.

The present invention has been described as charging and transferring data through a physical contact with conductive contacts and data contacts. The present invention also provides for wireless charging of the devices and wireless transfer of data between the controller and the devices.

The present invention has been described as providing bases, supports, and support arms that angle downwards such that the bases, supports, and support arms are not level. One embodiment may provide for level bases, supports, and support arms that enable drainage of fluids away from devices stored on supports and support arms. The drainage space between and underneath the supports and support arms reduces the fluids at or near the devices. Another embodiment may provide level supports and support arms and an angled base that is not level. Another embodiment may provide a level base with angled support arms and supports that are not level.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A charging system for storing and charging an electronic device, wherein the system releases the electronic device to an authenticated user, the system comprising:
a housing that accepts insertion of the electronic device;
a storage aperture of the housing, wherein the storage aperture accepts insertion of the electronic device into the housing;
a receiver located in the storage aperture that accepts the electronic device;
a locking base secured to the receiver, wherein the receiver is biased away from the locking base;
a locking arm that secures the receiver with the locking base, wherein the locking arm limits movement of the receiver in relation to the locking base.

2. The system of claim 1 further comprising:
a blocking arm pivotally attached to the locking base;
a first end of the blocking arm and a second end of the blocking arm, wherein the first end and the second end of the blocking arm pivot for lateral movement of the first end and the second end.

3. The system of claim 2, wherein the first end is located closer to an entrance of the housing than the second end.

4. The system of claim 3 further comprising:
a blocking finger extending laterally from the blocking arm, wherein the blocking finger is located at the first end of the blocking arm.

5. The system of claim 4 further comprising:
a positioning finger located at the second end of the blocking arm, wherein the positioning finger travels through a positioning track secured to the receiver, wherein the positioning track directs the positioning finger laterally to two points offset laterally.

6. The system of claim 1 further comprising:
a locking finger of the locking arm;
a locking track secured to the locking base, wherein the locking finger travels through the locking track to a first stopping point and a second stopping point located longitudinally apart;
a locked position located at the first stopping point for stopping the locking finger, wherein the locking finger in the locked position overcomes the bias of the biasing device to retain the receiver closer to the locking base than locking finger located at the second stopping point;
a release position located at the second stopping point for stopping the locking finger, wherein the locking finger in the release position is located longitudinally away from the first stopping point, wherein the biasing device biases the receiver away from the locking base farther than the locking finger in the locked position.

7. The system of claim 1 further comprising:
an actuator having an actuator body that extends laterally away from the actuator, wherein the actuator body contacts the locking finger to limit longitudinal movement of the locking finger.

8. The system of claim 7 further comprising:
a locking aperture in the locking arm, wherein the actuator body extends from the actuator and inserts into the locking aperture to limit movement of the locking arm, wherein the actuator body withdraws from the locking aperture to enable movement of the locking arm.

9. The system of claim 8, wherein the actuator body defaults to extending away from the actuator.

10. The system of claim 1 further comprising:
a conductor contact located longitudinally between the receiver and the locking base, wherein the conductor contact connects to power source for charging the device, wherein the conductor contact contacts the device.

11. A charging system for storing and charging an electronic device, wherein the system releases the electronic device to an authenticated user, the system comprising:
a housing that accepts insertion of the electronic device;
a storage aperture of the housing, wherein the storage aperture accepts insertion of the electronic device into the housing;
a receiver that accepts the electronic device;
a locking base secured to the receiver, wherein the receiver is biased away from the locking base for insertion of the device into the receiver;
wherein the receiver travels longitudinally to a locked position that maintains a first distance between the receiver and the locking base;
wherein the receiver travels longitudinally to a released position that maintains a second distance between the receiver and the locking base, wherein the first distance is less than the second distance;
a locking arm that secures the receiver with the locking base, wherein the locking arm adjusts the receiver to the locking position and the release position.

12. The system of claim 11 further comprising:
a locking finger of the locking arm;
a locking track secured to the locking base, wherein the locking finger travels through the locking track to a first stopping point and a second stopping point located longitudinally apart;
a locked position located at the first stopping point for stopping the locking finger, wherein the locking finger in the locked position overcomes the bias of the biasing device to retain the receiver closer to the locking base than locking finger located at the second stopping point;
a release position located at the second stopping point for stopping the locking finger, wherein the locking finger in the release position is located longitudinally away from the first stopping point, wherein the biasing device biases the receiver away from the locking base farther than the locking finger in the locked position.

13. The system of claim 12 further comprising:
an actuator having an actuator body that extends away from the actuator, wherein the actuator body contacts the locking finger to limit longitudinal movement of the locking finger.

14. The system of claim 13 further comprising:
a locking aperture in the locking arm, wherein the actuator body extends from the actuator and inserts laterally into the locking aperture to limit movement of the locking arm, wherein the actuator body withdraws from the locking aperture to enable movement of the locking arm.

15. The system of claim 11 further comprising:
a conductor contact located longitudinally between the receiver and the locking base, wherein the conductor contact connects to a power source for charging the device, wherein the conductor contact contacts the device;
wherein the conductor contact is biased away from the charging base.

16. The system of claim 13 further comprising:
a charging opening within the receiver, wherein the charging contact inserts into the charging opening through the receiver to contact the device.

17. The system of claim 11 further comprising:
a blocking arm pivotally attached to the locking base;
a first end of the blocking arm and a second end of the blocking arm, wherein the first end and the second end of the blocking finger pivot for lateral movement of the first end and the second end, wherein the blocking arm pivotally attaches to the locking base between the first end and the second, wherein the first end is located closer to an entrance of the housing than the second end;
a blocking finger extending laterally from the blocking arm, wherein the blocking finger is located at the first end of the blocking arm; and
a positioning finger located at the second end of the blocking arm, wherein the positioning finger travels through a positioning track secured to the receiver, wherein the positioning track directs the positioning finger laterally to two points offset laterally.

18. A charging system for storing and charging an electronic device, wherein the system releases the electronic device to an authenticated user, the system comprising:
a housing that accepts insertion of the electronic device;
a storage aperture of the housing, wherein the storage aperture accepts insertion of the electronic device longitudinally into the housing;
a receiver that accepts the electronic device;
a locking base secured to the receiver, wherein the receiver is biased longitudinally away from the locking base for insertion of the device into the receiver;
wherein the receiver travels longitudinally to a locked position that maintains a first distance between the receiver and the locking base;
wherein the receiver travels longitudinally to a released position that maintains a second distance between the receiver and the locking base, wherein the first distance is less than the second distance;
a locking arm that secures the receiver with the locking base, wherein the locking arm overcomes the bias on the receiver to maintain the first distance between the locking base and the receiver in the locking position.

19. The system of claim 18 further comprising:
a conductor contact located longitudinally between the receiver and the locking base, wherein the conductor contact connects to a power source for charging the device, wherein the conductor contact contacts the device;
wherein the conductor contact is biased away from the charging base;

a charging opening within the receiver, wherein the charging contact inserts into the charging opening through the receiver to contact the device.

20. The system of claim 19 further comprising:
a blocking arm pivotally attached to the locking base;
a first end of the blocking arm and a second end of the blocking arm, wherein the first end and the second end of the blocking finger pivot for lateral movement of the first end and the second end, wherein the blocking arm pivotally attaches to the locking base between the first end and the second, wherein the first end is located closer to an entrance of the housing than the second end;
a blocking finger extending laterally from the blocking arm, wherein the blocking finger is located at the first end of the blocking arm; and
a positioning finger located at the second end of the blocking arm, wherein the positioning finger travels through a positioning track secured to the receiver, wherein the positioning track directs the positioning finger laterally to two points offset laterally.

* * * * *